(12) United States Patent
Conklin

(10) Patent No.: US 12,013,910 B2
(45) Date of Patent: Jun. 18, 2024

(54) INTERACTIVE MAP-BASED USER SEARCH FOR ONLINE DATING CANDIDATES

(71) Applicant: Patrick Thomson Conklin, Mountainville, NY (US)

(72) Inventor: Patrick Thomson Conklin, Mountainville, NY (US)

(*) Notice: Subject to any disclaimer, the term of this patent is extended or adjusted under 35 U.S.C. 154(b) by 165 days.

(21) Appl. No.: 17/402,405

(22) Filed: Aug. 13, 2021

(65) Prior Publication Data

US 2023/0022692 A1 Jan. 26, 2023

Related U.S. Application Data

(60) Provisional application No. 63/225,878, filed on Jul. 26, 2021.

(51) Int. Cl.
*G06F 16/9537* (2019.01)
*G06F 16/29* (2019.01)
(Continued)

(52) U.S. Cl.
CPC .......... *G06F 16/9537* (2019.01); *G06F 16/29* (2019.01); *G06F 16/9535* (2019.01);
(Continued)

(58) Field of Classification Search
None
See application file for complete search history.

(56) References Cited

U.S. PATENT DOCUMENTS 5,452,371 A * 9/1995 Bozinovic .......... G06K 9/00416
345/676
RE38,640 E * 10/2004 Jundt ..................... G05B 15/02
700/79
(Continued)

OTHER PUBLICATIONS

Kibbe, Kayla; "Tinder Launches New Selfie Verification System to Prevent Catfishing"; InsideHook; accessed on Nov. 10, 2021 from https://www.insidehook.com/daily_brief/internet/tinder-launches-new-selfie-verification-system-to-prevent-catfishing (Year: 2020).*

(Continued)

*Primary Examiner* — Tony Mahmoudi
*Assistant Examiner* — Umar Mian
(74) *Attorney, Agent, or Firm* — Law Office of David J. Rosenblum

(57) ABSTRACT

In an aspect, an interactive electronic map module displays, from a screen, a geographical layout that includes land area divided into zip code regions defined by respective zip codes. Responsive to user selection in the land area, the selected zip code region is highlighted. Online dating candidates are filtered based on location within the selected zip code region. In another aspect, the module is configured for: a) interactively with the user, drawing for display a continuous line by, starting from a starting point, advancing to a current ending point; b) in real time, detecting user disengagement from the drawing; and c) responsive to detecting disengagement, highlighting display of the at least one enclosed area that was formed if the starting and current ending points are already connected or, if the starting and current ending points are not already connected, would be formed by connecting the points with a straight line. Filtering is based on location within an enclosed area. A surviving candidate's real-life likeness is displayed at his/her map location. Location identifying labels are removed/withheld from display by area/region or based on proximity to a surviving candidate.

9 Claims, 15 Drawing Sheets

(51) Int. Cl.
    *G06F 16/9535*     (2019.01)
    *G06F 16/9536*     (2019.01)
    *G06F 16/9538*     (2019.01)
    *G06Q 50/00*     (2024.01)

(52) U.S. Cl.
    CPC ...... *G06F 16/9536* (2019.01); *G06F 16/9538* (2019.01); *G06Q 50/01* (2013.01)

(56) References Cited

U.S. PATENT DOCUMENTS

| | | | |
|---|---|---|---|
| 8,295,851 B2 | 10/2012 | Finnegan et al. | |
| 8,555,207 B2 | 10/2013 | Hildreth et al. | |
| 9,158,414 B1 | 10/2015 | Gluzberg et al. | |
| 9,342,855 B1 | 5/2016 | Bloom | |
| 9,459,794 B1* | 10/2016 | Soegiono | G06F 3/04847 |
| 9,996,255 B2 | 6/2018 | Rav-Noy et al. | |
| 10,205,873 B2 | 2/2019 | Jung et al. | |
| 10,541,959 B2 | 1/2020 | Philipson | |
| 2005/0086211 A1 | 4/2005 | Mayer | |
| 2007/0282621 A1* | 12/2007 | Altman | G09B 29/10 |
| | | | 705/319 |
| 2008/0005674 A1* | 1/2008 | Wattenberg | G06F 16/26 |
| | | | 715/730 |
| 2010/0169376 A1 | 7/2010 | Chu | |
| 2011/0055321 A1 | 3/2011 | Loeb et al. | |
| 2011/0252340 A1* | 10/2011 | Thomas | G06Q 10/107 |
| | | | 715/756 |
| 2012/0290978 A1* | 11/2012 | Devecka | G06Q 30/0277 |
| | | | 715/810 |
| 2014/0199970 A1* | 7/2014 | Klotz | H04W 4/02 |
| | | | 455/411 |
| 2014/0228060 A1 | 8/2014 | Abhyanker | |
| 2014/0230025 A1 | 8/2014 | Abhyanker | |
| 2015/0058059 A1 | 2/2015 | Kahan et al. | |
| 2015/0127638 A1 | 5/2015 | Parks et al. | |
| 2016/0004778 A1* | 1/2016 | Finder | H04L 51/32 |
| | | | 707/722 |
| 2016/0005134 A1* | 1/2016 | von Gontard | G06Q 50/01 |
| | | | 705/319 |
| 2016/0063013 A1 | 3/2016 | Finnegan et al. | |
| 2016/0155181 A1* | 6/2016 | Romaya | G06Q 50/167 |
| | | | 705/26.63 |
| 2018/0036771 A1 | 2/2018 | Lewin | |
| 2018/0239762 A1* | 8/2018 | Takeuchi | G06F 16/248 |
| 2019/0294646 A1 | 9/2019 | Levy et al. | |
| 2019/0392008 A1* | 12/2019 | Sharp | H04L 51/32 |
| 2020/0120170 A1 | 4/2020 | Amitay et al. | |
| 2020/0286619 A1* | 9/2020 | Clark | G06T 11/60 |
| 2021/0082063 A1* | 3/2021 | Miller | G06F 16/29 |
| 2021/0149930 A1* | 5/2021 | Alvarez | G06F 16/909 |

OTHER PUBLICATIONS

Zastrow, Philip. "How To Use Opacity and Transparency to Create a Modal in CSS." Published on Dec. 29, 2021. Accessed Mar. 2, 2022 from https://www.digitalocean.com/community/tutorials/how-to-use-opacity-and-transparency-to-create-a-modal-in-css (Year: 2021).*

"Picture element." FOLDOC: Free On-Line Dictionary of Computing. Published May 8, 1998. Accessed Mar. 3, 2022 from http://foldoc.org/picture+element (Year: 1998).*

MapsZipCode.com, Zip Code Maps, 1 page, [retrieved on Apr. 16, 2021]. Retrieved from the Internet <URL: http://www.mapszipcode.com/>.

Saidakbar P, Interactive Map visualization with Folium in Python, 1 page, [retrieved on Apr. 7, 2021]. Retrievedfrom the Internet <URL: https://medium.com/@saidakbarp/interactive-map-visualization-with-folium-in-python-2e95544d8d9b>.

ZIP Code Radius Map, 1 page, [retrieved on Apr. 7, 2021]. Retrieved from the Internet <URL: https://www.unitedstateszipcodes.org/zip-code-radius-map.php>.

Spatialteq, Build_Territories_by_Selecting_Geography_Units, 1 page, [retrieved on Mar. 18, 2021]. Retrieved from the Internet <URL: Mapbusinessonline.com/Support.aspx/Article/design_sales_ter_by_zip_code>.

Ringcentral, How_to_Create_an_Effective_Sales_Territory, 1 page, [retrieved on Apr. 5, 2021]. Retrieved from the Internet <URL: https://www.ringcentral.com/us/en/blog/sales-territory-plan/>.

Spatialteq, Sales Territory Mapping is Easy with MapBusinessOnline, 1 page, [retrieved on Apr. 6, 2021]. Retrieved from the Internet <URL:https://www.mapbusinessonline.com/Solution.aspx/SalesTerritoryMapping>.

Spatialteq, Manually_Create_Territories_One_by_One, 1 page, [retrieved on Apr. 7, 2021]. Retrieved from the Internet <URL: https://www.mapbusinessonline.com/Support.aspx/Article/design_sales_ter_by_zip_code>.

Mapline, Build_a_Map_of_US_States,_Counties,_and_Zip_Codes, 1 page, [retrieved on Mar. 18, 2021]. Retrieved from the Internet <URL: https://mapline.com/features/build-a-territory-map-of-state-county-or-zip-code-boundaries/>.

Zeemaps, Zip_Code_-_Highlight_and_Color_US_Counties, 1 page, Aug. 30, 2013, [retrieved on Mar. 18, 2021]. Retrieved from the Internet <URL: https://www.zeemaps.com/blog/zip-code-highlight-and-color-us-counties/>.

Murphy, Alyssa, Dating Dangerously: Risks Lurking within Mobile Dating Apps. Catholic University Journal of Law and Technology, 26 Cath. U. J. L. & Tech 100 (2017), [retrieved on May 12, 2021]. Retrieved from the Internet <URL: https://scholarship.law.edu/jlt/vol26/iss1/7?utm_source=scholarship.law.edu%2Fjlt%2Fvol26%2Fiss1%2F7&utm_medium=PDF&utm_campaign=PDFCoverPages>.

geonames.corg, postal codes London City, 1 page, [retrieved on Jul. 30, 2022]. Retrieved from the Internet <URL: http://www.geonames.org/postalcode-search.html?q=London+City&country=GB>.

National Center for Biotechnology Information, U.S. National Library of Medicine, Murdani, et al., Efficient Proximity Computation Techniques Using Zip Code Data for Smart Cities, 1 page, [retrieved on Apr. 13, 2021]. Retrieved from the Internet <URL: https://www.ncbi.nlm.nih.gov/pmc/articles/PMC5948496/>.

Microsoft, HoloLens 2 gestures for authoring and navigating in Dynamics 365 Guides, 1 page, Jan. 28, 2020, [retrieved on Jul. 9, 2021]. Retrieved from the Internet <URL: https://docs.microsoft.com/en-us/dynamics365/mixed-reality/guides/authoring-gestures-hl2>.

Nevon Projects, 3D Holographic Display System with Gesture Controller, 1 page, [retrieved on Jul. 9, 2021]. Retrieved From the Internet <URL: https://nevonprojects.com/3d-holographic-display-system-with-gesture-controller/>.

GestureTek, Interactive Information Displays, 1 page, [retrieved on Jul. 5, 2021]. Retrieved from the Internet <URL: https://gesturetekhealth.com/solutions/interactive-information-displays>.

Datedoo.com, DATE_LIKE_A_PRO_SIGN_UP_TO_MEET_LOVEABLE_GIRLS, 1 page, [retrieved on Apr. 20, 2021]. Retrieved from the Internet <URL: https://www.datedoo.com/>.

Ladders, Kirkham, 2019 survey on dating and distance how far are people willing to look for love, 1 page, Jun. 26, 2019, [retrieved on Apr. 20, 2021]. Retrieved from the Internet <URL: https://www.theladders.com/career-advice/2019-survey-on-dating-and-distance-how-far-are-people-willing-to-look-for-love>.

Bloomberg, Florida, The Geography of Online Dating, 1 page, Apr. 16, 2019, [retrieved on Apr. 20, 2021]. Retrieved from the Internet <URL:https://www.bloomberg.com/news/articles/2019-04-16/proximity-in-distance-and-age-drives-online-dating.

Mashable, Revis, 5 Location-Based Dating Apps Worthy of Your Love, 1 page, Nov. 22, 2011, [retrieved on Apr. 20, 2021]. Retrieved from the Internet <URL: https://mashable.com/2011/11/22/location-based-dating-apps/>.

Cupid, Relish_Exclusive_Dating_in_New_York_City, 1 page, [retrieved on Apr. 8, 2021]. Retrieved from the Internet <URL: https://www.cupid.com/en/city/new-york-city/>.

Cupid, Choose Your City, 1 page, [retrieved on Apr. 8, 2021]. Retrieved from the Internet <URL: https://www.cupid.com>.

* cited by examiner

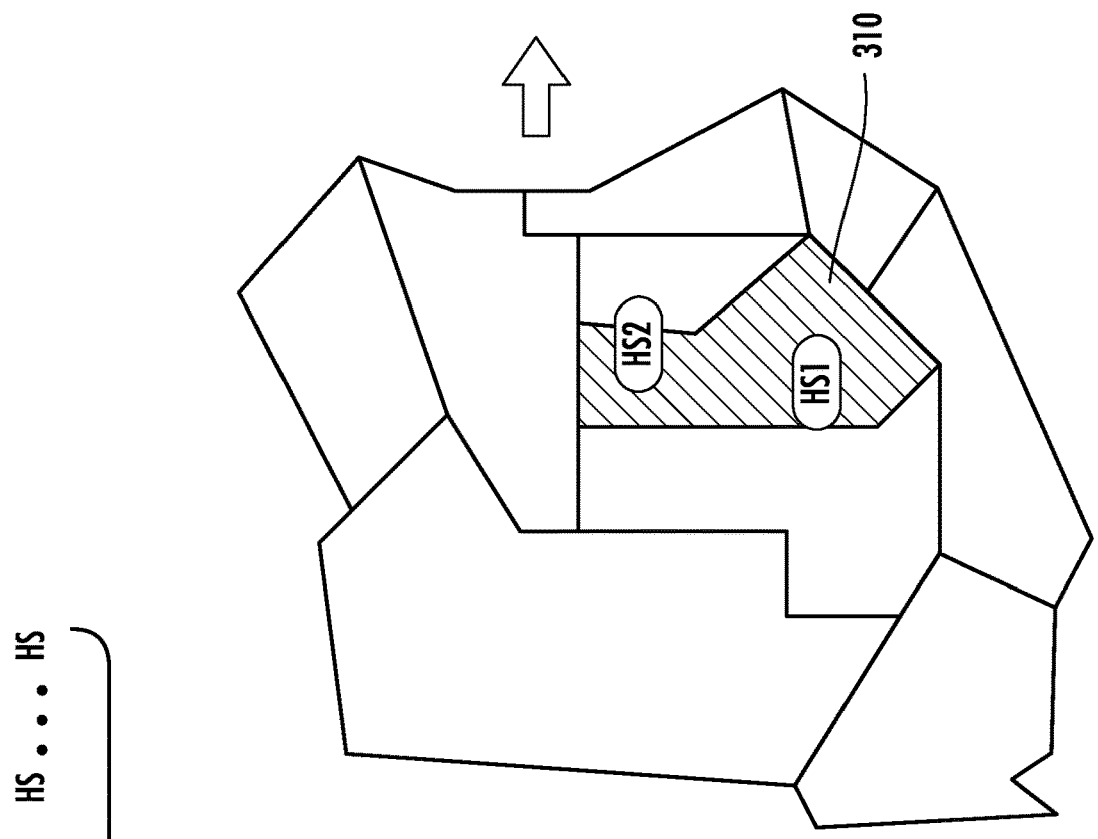
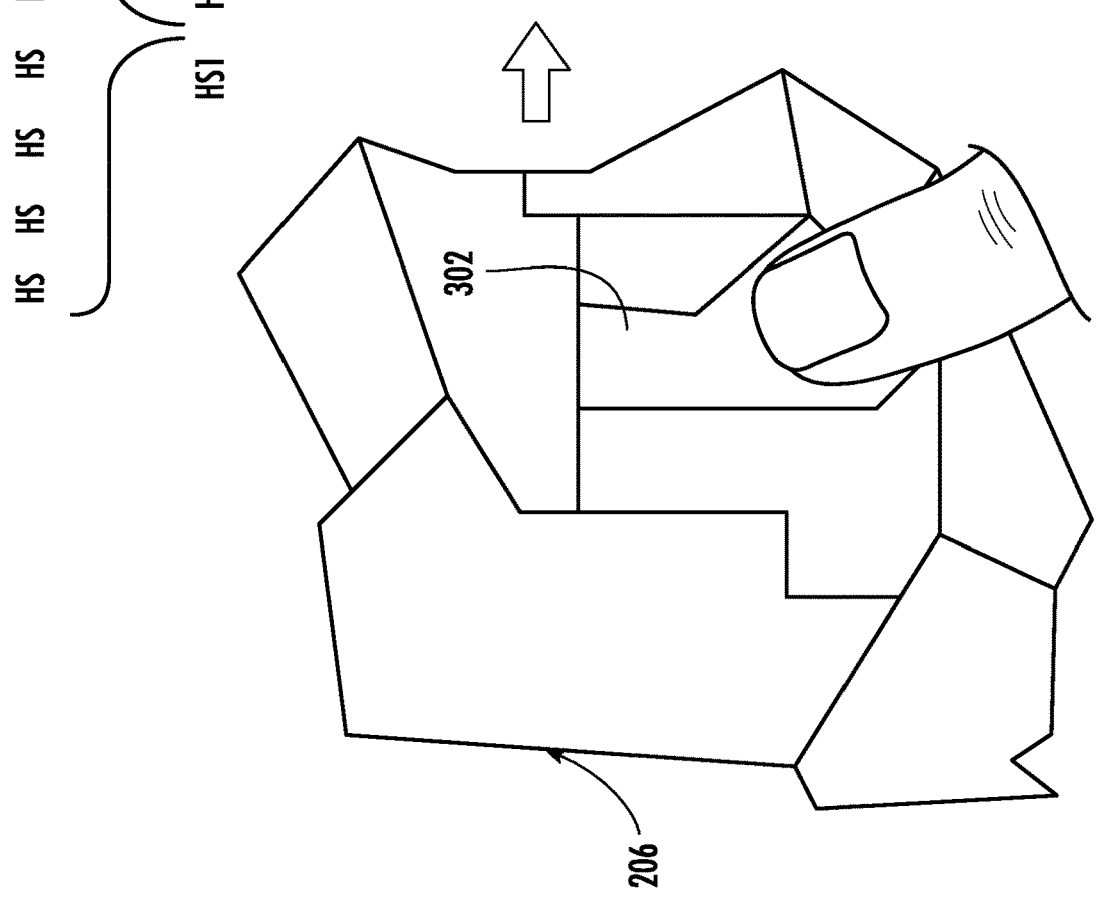
FIG. 3

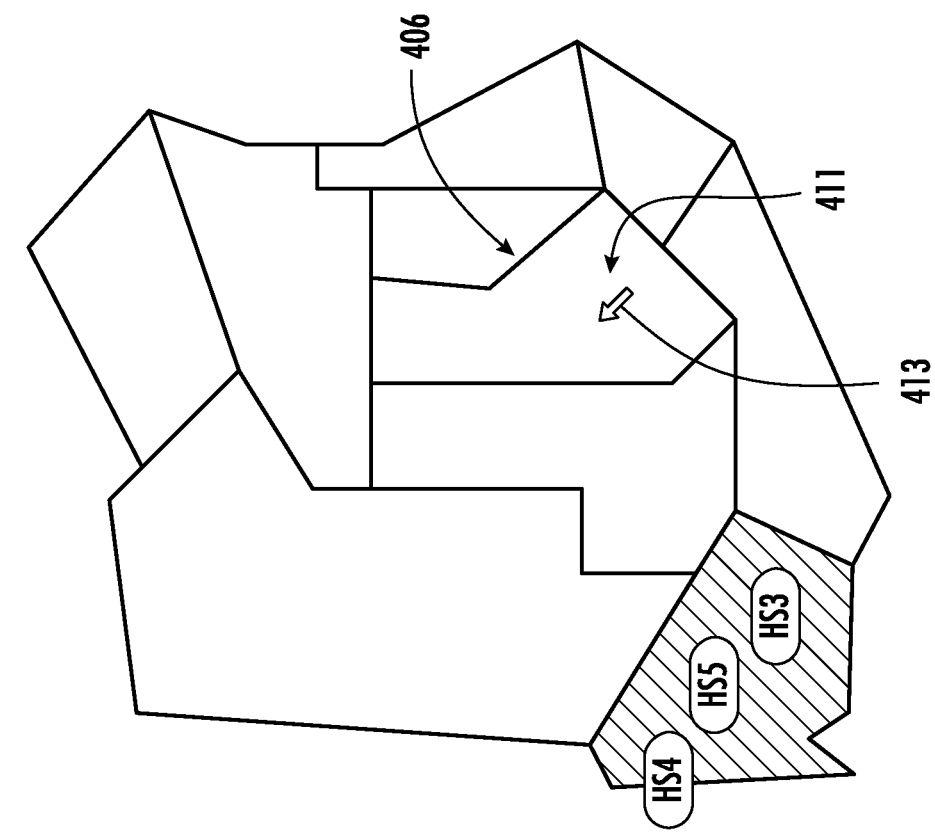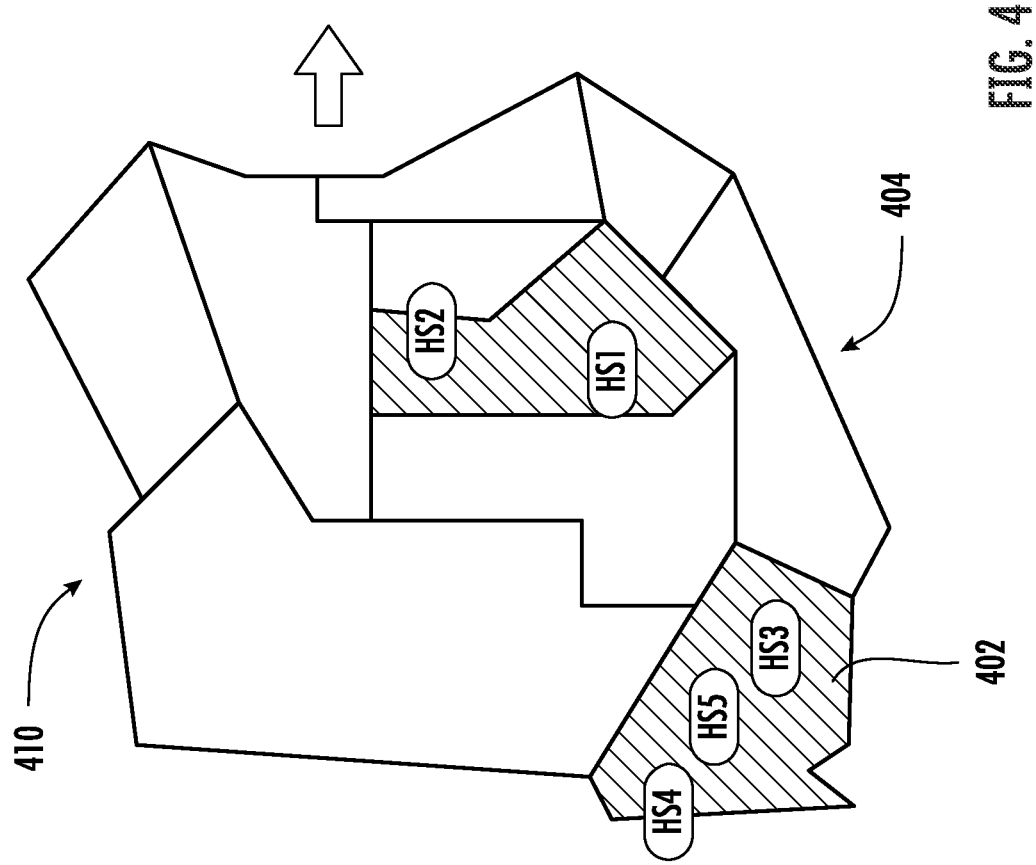
FIG. 4

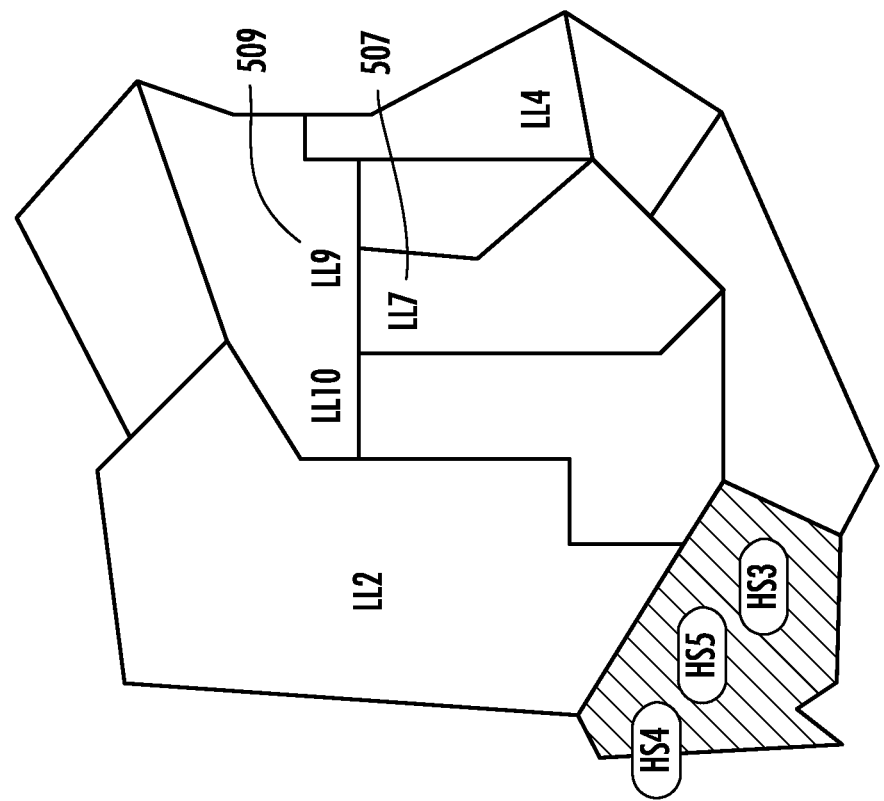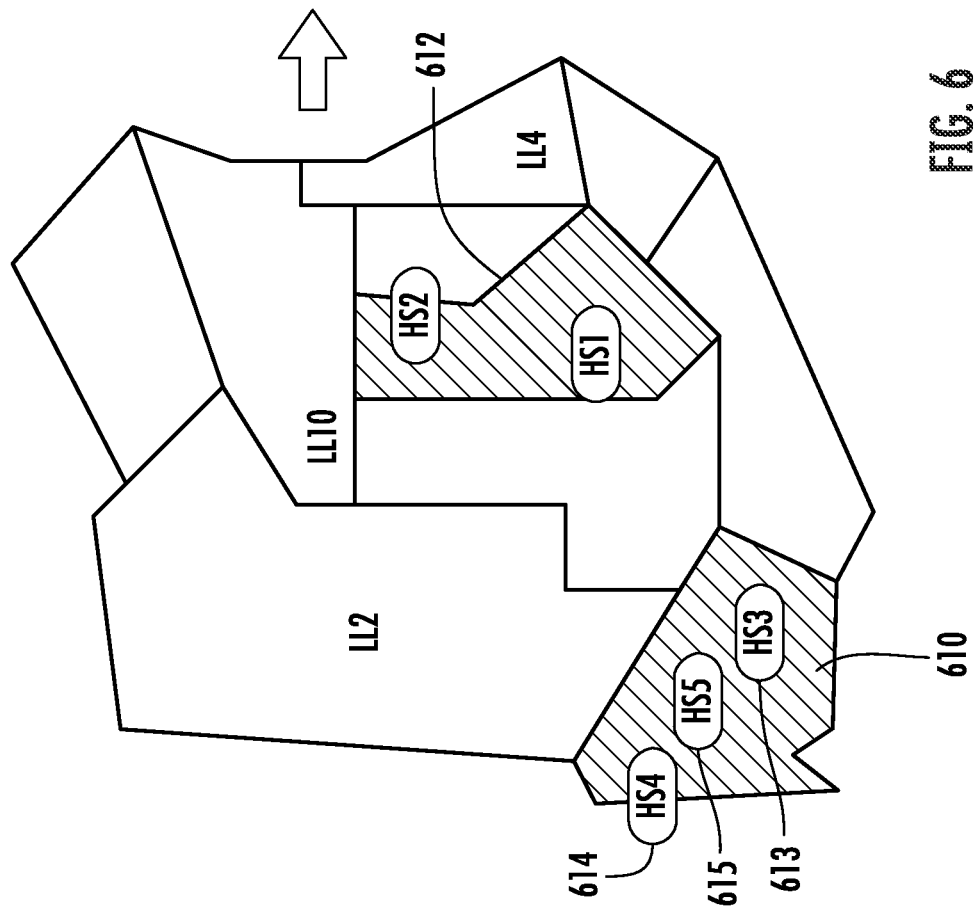
FIG. 6

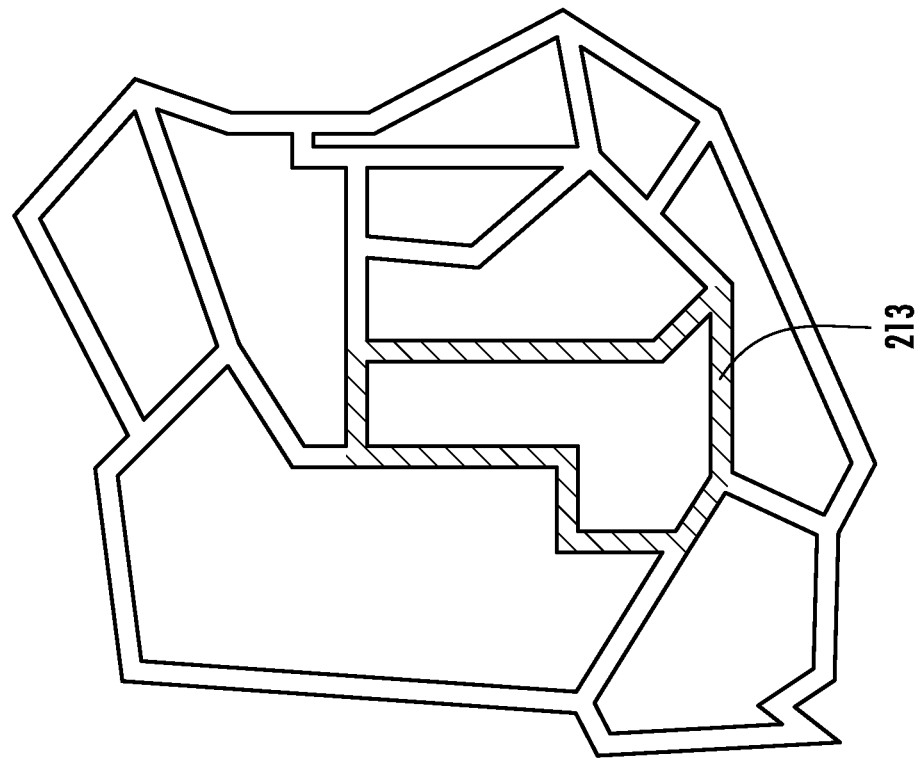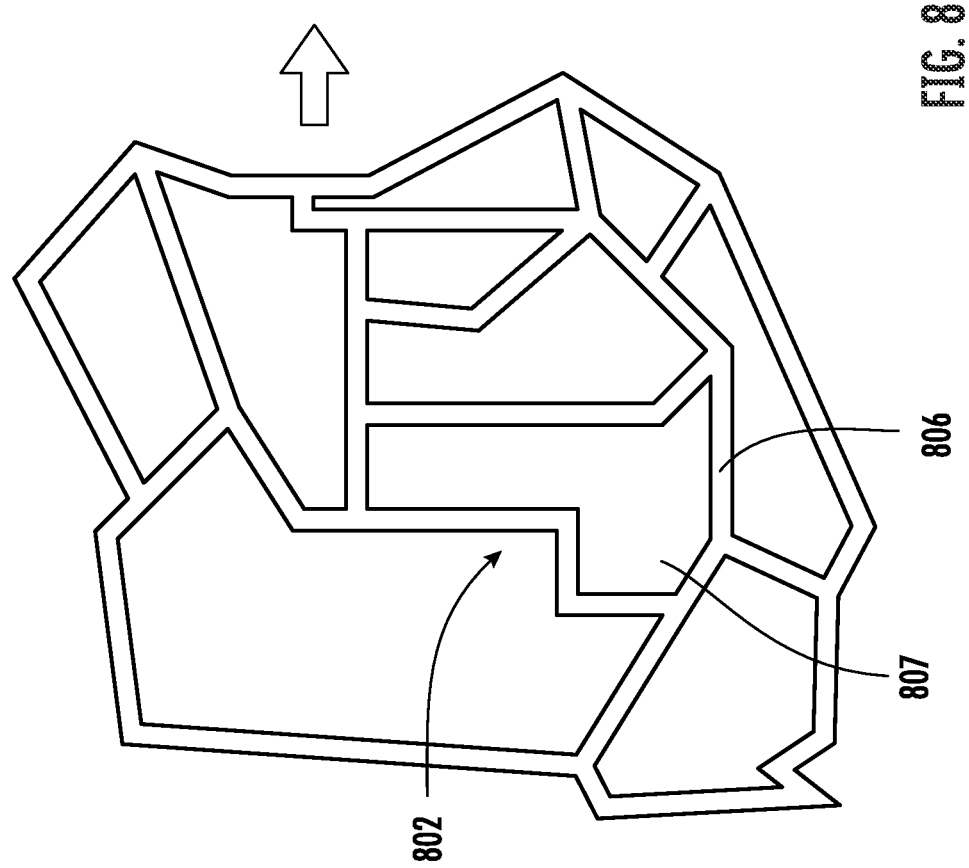
FIG. 8

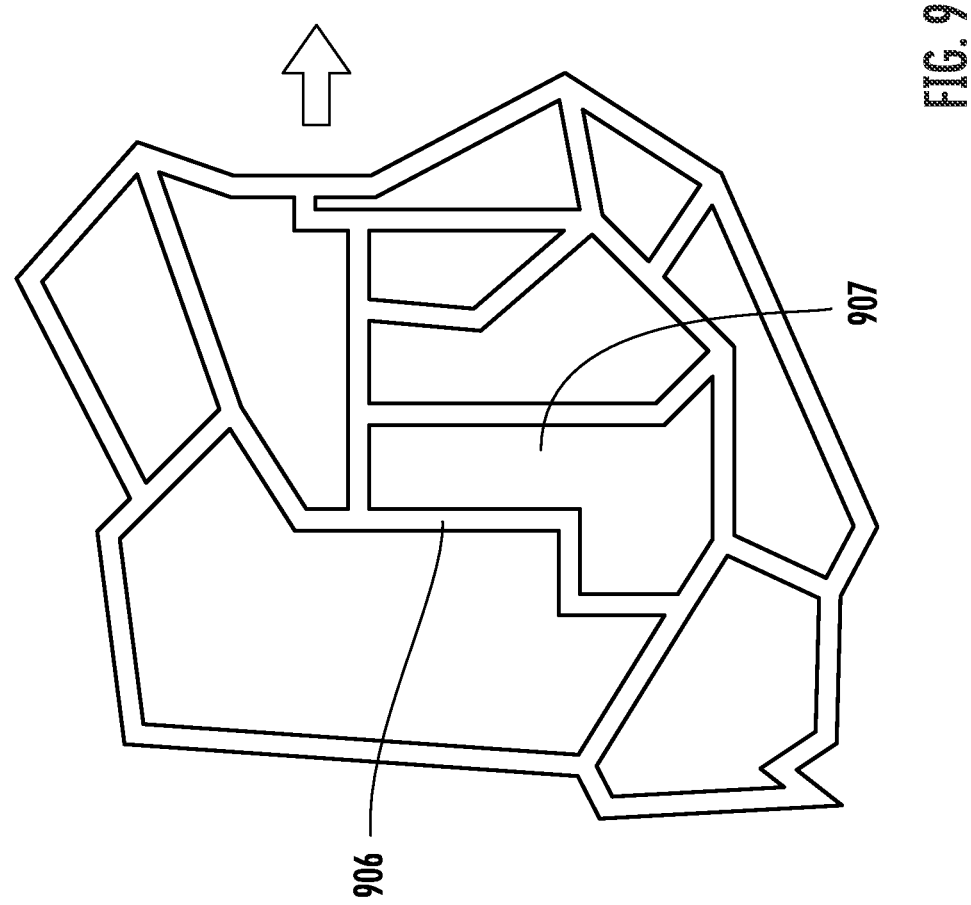
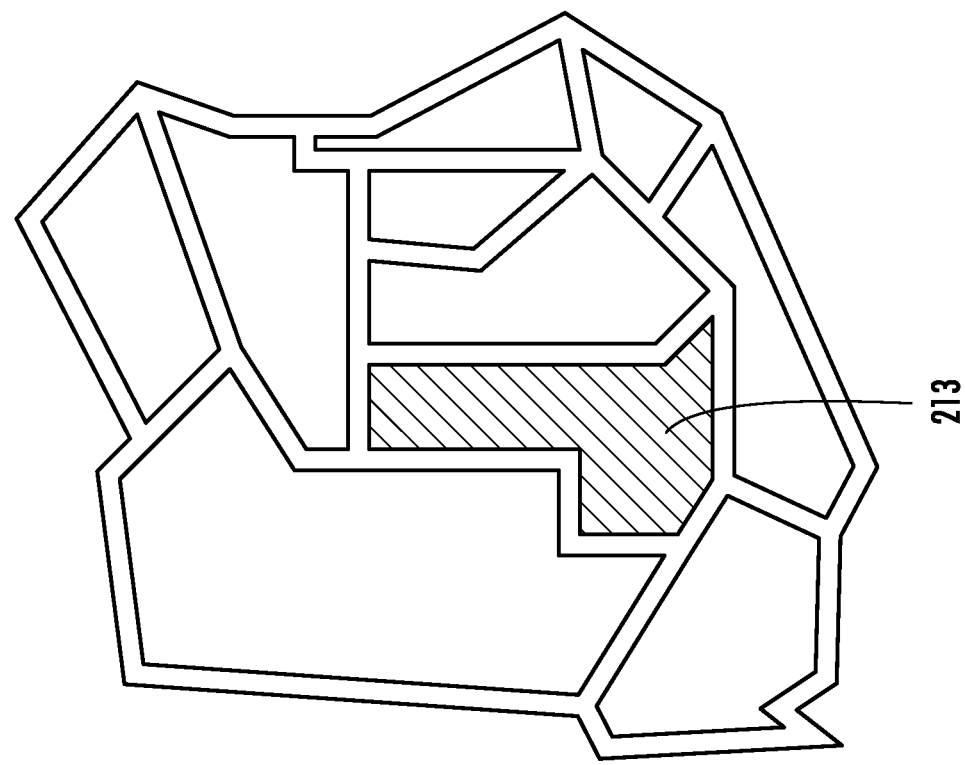
FIG. 9

INTERACTIVE MAP-BASED USER SEARCH FOR ONLINE DATING CANDIDATES

CROSS-REFERENCE TO RELATED APPLICATION

This application claims the benefit of U.S. Provisional Patent Application No. 63/225,878 filed Jul. 26, 2021.

FIELD OF THE INVENTION

The present invention relates to online dating candidate search and, more particularly, to interactive map-based methods for online dating candidate search.

BACKGROUND

Many users and potential users of online dating are concerned with not only privacy, but their physical security. Alyssa Murphy, Dating Dangerously: Risks Lurking within Mobile Dating Apps, 26 Cath. U. J. L. & Tech 100 (2017). https://scholarship.law.edu/jlt/vol26/iss1/7?utm_source=scholarship.law.edu%2Fjlt%2Fvol26%2Fiss1%2F7&utm_medium=PDF&utm_campaign=PDFCoverPages US2005/0086211 to Mayer says that online dating users do not like to provide profile pictures of themselves although they do prefer to search dates that have pictures. Mayer therefore allows users to, for privacy, build "approximate pictures" in place of providing actual pictures.

US2012/0290978 to Devecka discloses a user interface for entering a value in an off-map search filter that includes a geographic or location limiter. Devecka shows displaying the search results on a large-region map. This causes dating profiles with respective displayed faces of dating candidates to be displayed together on the map at the respective locations of the candidates. The dating profiles can be highlighted by the user. For the location limiter, the user may elect to provide only his/her street name rather than the complete address. Devecka mentions utilizing, for privacy, either an avatar or no photo at all in an online dating public profile.

US2021/0082063 to Miller discloses a social network user, seeking a potential match with another user, entering a zip code to retrieve a list of candidates. As another embodiment, Miller shows the user viewing a building (such as the one where he/she lives) on a map on his or her phone screen. The user draws a closed boundary defining a region of the building. The map shows the names of potential matches located within the circumscribed region of the building. The name consists of a first name together the initial letter of the last name and is positioned onscreen where the potential match is located. Below the map, the screen shows a list of these potential matches (i.e., with just the first letter of the last name) which are selectable to see their profiles. The profiles may include profile pictures. Miller mentions a number of privacy options by which a user may limit information given out but does not say whether the profile pictures are real-life likenesses, e.g., photos.

SUMMARY

The present invention is directed to addressing one or more of the above concerns.

What is needed is a user-friendly graphical user interface (GUI) for quickly finding and assessing online dating candidates while respecting privacy and safety concerns.

In an aspect of the present invention, an interactive electronic map module displays, from a screen, a geographical layout that includes land area. The land area is divided into zip code regions defined by respective zip codes. Responsive to user selection in the land area, the interactive electronic map module highlights, in its display from the screen, the selected zip code region. Online dating candidates are filtered based on location within the selected zip code region.

In a sub-aspect, if the selected zip code was being displayed from the screen just prior to the user selection, the user selection removes the selected zip code from being displayed from the screen. Optionally, removal may further depend on whether both a candidate survives the filtering for the selected zip code and a facial image of a surviving candidate is, for the selected zip code, displayed from the screen.

In a related sub-aspect, if the selected zip code is not being displayed from the screen just prior to the user selection, the user selection does not, by itself, trigger revelation of the selected zip code to the user. Withholding of revelation, i.e., revelation by displaying the selected zip code to the user or otherwise, may optionally further depend on whether both a candidate survives the filtering for the selected zip code and a facial image of a surviving candidate is, for the selected zip code, displayed from the screen.

In another related sub-aspect, if any of the online dating candidates being filtered survive the filtering due to their location within the selected zip code region, respective facial images of the surviving candidates are displayed from the screen at the respective locations of the surviving candidates.

In a further sub-aspect of the above, the facial images are, correspondingly, real-life likenesses of the surviving candidates.

In one other related sub-aspect, responsive to the filtering, location identifying labels (zip codes being one example of such) within respective threshold distances of the locations of the surviving candidates are removed from display from the screen, if any of the candidates have survived.

In a similar sub-aspect, responsive to the filtering yielding at least one surviving candidate, all, if any, location identifying labels within the selected zip code region are removed from display from the screen.

In another aspect of the invention, a program for online dating that comprises an interactive electronic map module configured for displaying from a screen is configured for, via the interactive electronic map module, a) interactively with the user, drawing for display from the screen a continuous line by, starting from a starting point, advancing to a current ending point; b) in real time, detecting user disengagement from the drawing; and c) responsive to the detecting of the user disengagement, highlighting display from the screen of the at least one enclosed area that was formed if the starting and current ending points are already connected or, if the starting and current ending points are not already connected, that would be formed by connecting the starting and current ending points with a straight line. The program is further configured for filtering online dating candidates based on location within an enclosed area from among the at least one enclosed area.

In a sub-aspect, if any of the online dating candidates being filtered survive the filtering due to their location within an enclosed area from among the at least one enclosed area, facial images of the surviving candidates are displayed from the screen at respective locations of the surviving candidates.

In a further sub-aspect, responsive to the filtering, all, if any, location identifying labels that are disposed within an enclosed area from among the at least one enclosed area in which a candidate has survived are removed from display from the screen.

In another further sub-aspect, all, if any, location identifying labels disposed within respective threshold distances of the locations of the surviving candidates are removed from display from the screen if an online dating candidate from among the online dating candidates has survived.

Relatedly, in another aspect, a program for online dating that comprises an interactive electronic map module configured for displaying from a screen is configured for, via the interactive electronic map module, a) interactively with the user, drawing for display from the screen a continuous line by, starting from a starting point, advancing to a current ending point; and b) detecting user disengagement from the drawing. The program is configured for, after the detecting of the user disengagement, filtering online dating candidates based on location within an enclosed area from among the at least one enclosed area that was formed if the starting and current ending points are already connected or, if the starting and current ending points are not already connected, that would be formed by connecting the starting and current ending points with a straight line.

In a sub-aspect, if any of the online dating candidates being filtered survive the filtering due to their location within an enclosed area from among the at least one enclosed area, the displaying from the screen by the interactive electronic map module includes displaying, at the locations of the surviving candidates, respective facial images of the surviving candidates. The facial images are respective real-life likenesses of the surviving candidates.

In a further sub-aspect, responsive to the filtering, all, if any, location identifying labels that are disposed within an enclosed area from among the at least one enclosed area in which a candidate has survived are removed from display from the screen.

In a different further sub-aspect, all, if any, location identifying labels disposed within respective threshold distances of the locations of the surviving candidates are removed from display from the screen if an online dating candidate from among the online dating candidates has survived.

Details of the innovative interactive map-based methods for online dating candidate search are set forth further below, with the aid of drawings, which are not drawn to scale.

BRIEF DESCRIPTION OF THE DRAWINGS

FIG. 3 is a schematic diagram exemplary of a user selection on an interactive electronic map of a zip code region, with its outline displayed beforehand, and, based on user selection, filtering online dating candidates in accordance with an aspect of the invention;

FIG. 4, a continuation of FIG. 3, includes exemplary selection on an interactive electronic map of another zip code region and deselection of a previously-selected zip code region, in building a candidate search area by which to filter online dating candidates in accordance with an aspect of the invention;

FIG. 6, a continuation of FIG. 5, demonstrates, by example, building a candidate search area, on an interactive electronic map by which to filter online dating candidates, by adding another such zip code region and deselecting a previously-selected zip code region, the latter restoring the location identifying label(s) previously removed in accordance with an aspect of the invention;

FIG. 8 is a schematic diagram exemplary of user selection on an interactive electronic map of a zip code region, presented beforehand with a thickened outline, by which to filter online dating candidates wherein highlighting is applied to the outline in accordance with an aspect of the invention;

FIG. 9 is a schematic diagram exemplary of user selection on an interactive electronic map of a zip code region, presented beforehand with a thickened outline, by which to filter online dating candidates wherein highlighting provides fill in accordance with an aspect of the invention;

DETAILED DESCRIPTION

Figure 1:
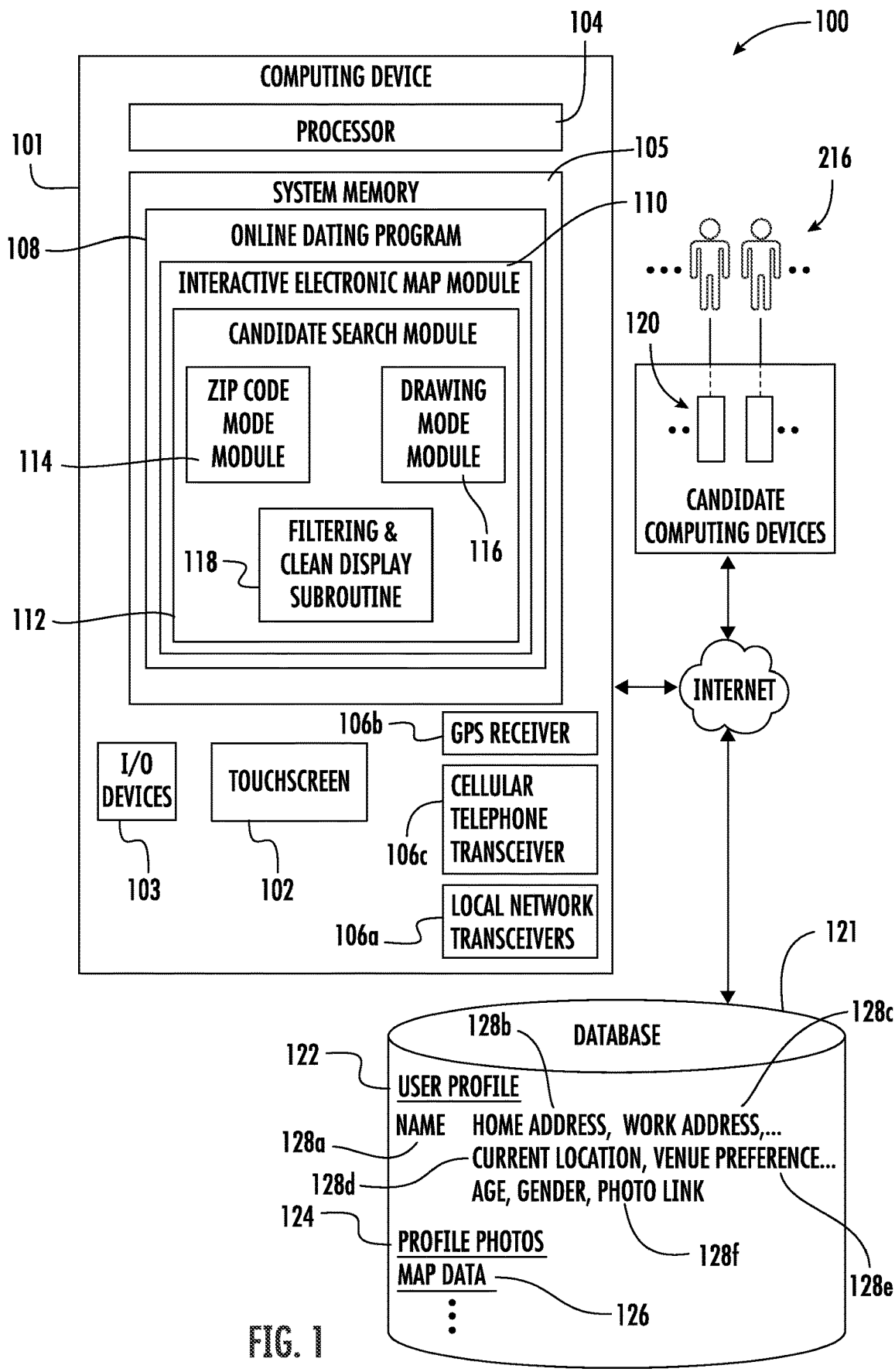
FIG. 1 is a schematic diagram exemplary of a computing system including computing devices and a database in accordance with an aspect of the present invention.

FIG. 1 shows, by illustrative and non-limitative example, a computing system 100 that includes a computing device 101 designed for telecommunication. A user of an online dating program may operate the computing device 101 to arrange and assist with dating. The computing device 101 may be a mobile phone or other mobile device. Or it can be desktop computer or other stationary device. Thus, the computing device 101 includes as seen in FIG. 1 a touchscreen 102. Although, an alternative is a screen, e.g., for a laptop or desktop, that is not touch enabled if the computing device 101 is equipped with, for example, a mouse or touchpad. A holographic screen such as that marketed under the brand MICROSOFT HOLOLENS 2 with non-contact gesture control is another possibility.

The computing device 101 further includes other input/output (I/O) devices 103 such as a speaker. It also includes a processor 104 and a system memory 105. It may additionally include a local network transceiver 106a for wireless communication protocols such as WIFI and BLUETOOTH. It may also, as a portable device, include a Global Positioning System (GPS) receiver 106b and, if a phone, a cellular telephone transceiver 106c.

The system memory 105 includes an online dating program 108 which includes an interactive electronic map module 110.

The interactive electronic map module 110 includes a candidate search module 112. It may also provide other services such as displaying a route by which a user can travel to arrive at the agreed upon dating venue.

The candidate search module 112 includes a zip code mode module 114, a drawing mode module 116, and a filtering and clean display subroutine 118. The zip code mode module 114 and the drawing mode module 116 both call the filtering and clean display subroutine 118. The latter filters the population of dating candidates and identifies the surviving candidates while respecting safety and privacy concerns.

The computing system 100 includes, in addition to the computing device 101, the computing devices 120 of other users, i.e., candidates 216 (shown in FIG. 1), of the online dating program 108.

The computing system 100 has a database 121 that includes, for the candidates 216, user profiles 122 and profile photos 124. It further includes map data 126 utilized for example when panning and zooming in or out and for starting a candidate search at a requested location.

An entry for a user profile 122 includes fields for name 128a, home address 128b, work address 128c, current location 128d, venue preference 128e, and other data such as age, gender, education, income level, and a link 128f to a profile photo 124. Some of the information may be supplied at the outset, some may be optional, and some may be elicited along the way in preparing for a candidate search. The venue preference 128e could be a type of or particular restaurant, a park location, a skating rink, etc. and may be posted by users to the network as a preferred location for a first date. The GPS receiver 106b can determine the current location 128d for users who subscribe to an optional real-time location service. The online dating program 108 and other constituents of the computing system 100 employed by the users 216 are implementable by any known and suitable combination of software, hardware and firmware.

Figure 2:
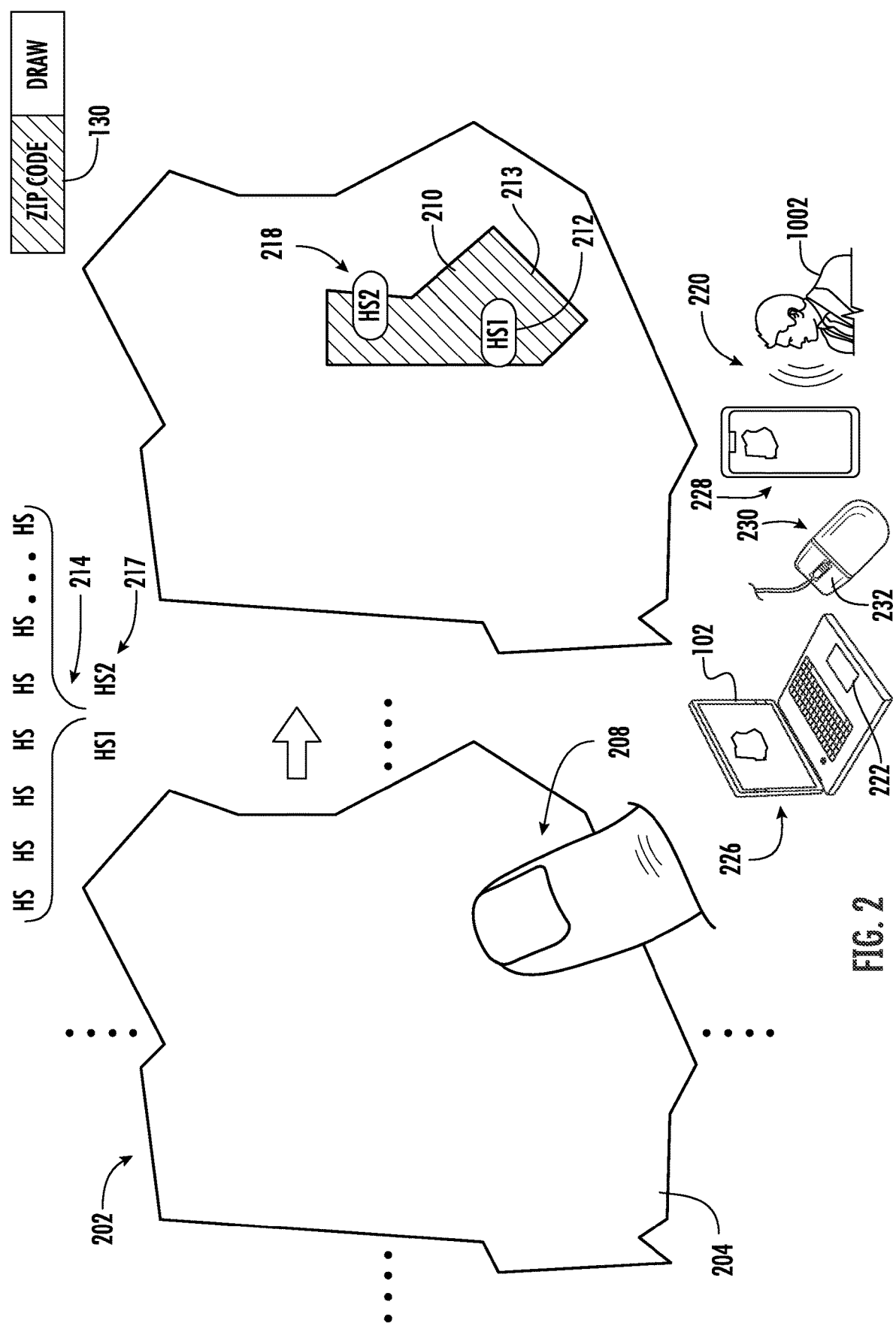
FIG. 2 is a schematic diagram exemplary of a user selection on an interactive electronic map of a zip code region by which to filter online dating candidates in accordance with an aspect of the invention.

FIG. 2 demonstrates exemplary operation by a user 1002 of the interactive electronic map module 110 in a zip code mode 130 of operation. In the instant scenario, the user 1002 is going to perform a map-based search for online dating candidates 216. This involves the user 1002 specifying a search area on a map. The search criterion to be applied in the search area may be pre-set. Or, for example, options such as home address 128b, work address 128c, current location 128d, venue preference 128e may be selectable onscreen. The interactive electronic map module 110 displays, from a screen such as the touchscreen 102, a geographical layout 202 that includes land area 204. The user 1002 may have entered a value to bring up onscreen map area that includes the displayed geographical layout 202. Or the user 1002 may, from a previously displayed geographical layout 202, have panned to, zoomed in on, or zoomed out to the currently displayed geographical layout 202. Any reference below to a screen will assume the touchscreen 102, except where otherwise indicated.

The land area 204 is, as seen in FIG. 3, divided into zip code regions 302.

Figure 7:
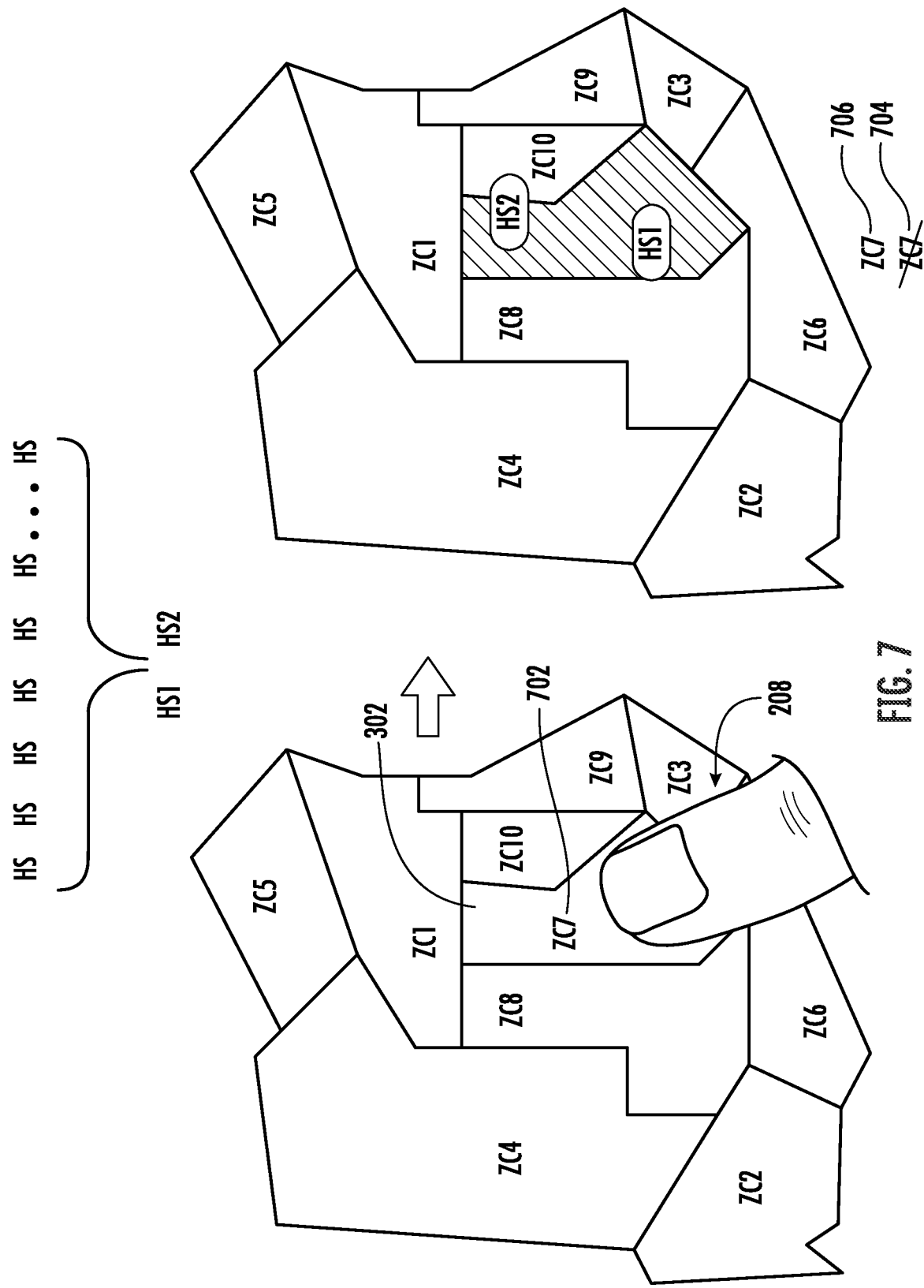
FIG. 7 is a schematic diagram exemplary of a user selection on an interactive electronic map of a zip code region, with its outline displayed beforehand, by which to filter online dating candidates and, further responsive to the user selection, removing location identifying label(s), a zip code being an example of such a label, in accordance with an aspect of the invention.

Although, in the FIG. 2 embodiment, zip code boundaries or "outlines" 206 are, at the outset, hidden from display. The zip code regions 302 are defined by respective zip codes (or "postal codes") 702, as seen in FIG. 7.

The zip codes 702 are likewise at the outset hidden from display in the FIG. 2 embodiment.

In zip code mode 130, a user selection 208 (i.e., touch or tap on the screen 102) in the land area 204, that the interactive electronic map module 110 recognizes as having made a selection, selects a zip code region, i.e., the selected zip code region 210. In particular, the user selection 208 is sensed by a pixel or group of pixels. Each pixel has been pre-mapped to a respective one of the zip code regions 302. When the pixels, of a group, point to different zip code regions 302 because the user 1002 has tapped on or partly on a zip code outline 206 (depicted in FIG. 3), either it is decided that a zip code region 302 has been selected (e.g., by majority rule) or that no selection has been made. Alternatively, more than a simple majority of the pixels of a group may be needed to decide that a selection has been made. If no selection is made, no zip code region 302 responsively becomes highlighted. Highlighting can be characterized by a change in color or brightness, by blinking, or by any other known and suitable indicator. The pixel mapping changes each time the user's gesture causes panning or zooming onscreen. As will be discussed further below, tapping on an already highlighted zip code region 210 deselects the region.

When a zip code region 302 has been selected in zip code mode 130, the corresponding one of the zip codes 702 is inherently selected.

The user selection 208, in this FIG. 2 and all embodiments shown from this point forward, does not, by itself, cause 704 (as represented in FIG. 7 by the cross-out of "ZC7") the program 108 to display the selected zip code 706 from the screen or to otherwise reveal, by computer speech for instance, the selected zip code 706 to the user 1002. In particular, on the one hand, the user selection 208 may result in a candidate's facial image (in a headshot for example) 212 being shown and, responsive to further user action, possible disclosure of user profile information that includes the candidate's zip code 702. The user selection 208 will not, however, by itself reveal the zip code 702 of a candidate 216 by displaying it or otherwise.

The user selection 208, as mentioned, highlights 213 the selected zip code region 210. At this stage, the user 1002 will typically have already completed, or partially completed, a user profile 122.

The population of candidates 216 for the online dating program 108 may, at this stage, have already been partially filtered based on possible matching between the user profile 122 of the user 1002 and the user profile information of the other users, i.e., candidates 216.

A set of candidates 216, or a set of remaining candidates 216 if partial filtering has already occurred, is filtered 214 based on the selected zip code region 210.

More particularly, the filtering 214 is based on any one or more of whether the online dating candidate 216 lives in, works in, is currently located in, or has indicated a preference for a dating venue in the selected zip code region 210. The filtering 214 can be based, for example, on whether the candidate 216 lives in and/or works in the selected zip code region 210. Any one or more of the home address 128b, work address 128c, current location 128d, venue preference 128e fields may be implemented in the user profile 122. Or, any one or more of the field values can be elicited from the user 1002 on the fly while the map-based search is being prepared.

The filtering 214 can occur responsive to the user selection 208 of the selected zip code region 210. It may occur in real-time response to the user selection 208. Or actuation by the user 1002 of an onscreen soft button (not shown) such as "FILTER" can trigger the filtering 214.

If one or more candidates 216 survive the filtering 214, facial images 212 of the surviving candidates 217 from the user profile 122 are displayed from the screen 102 at the respective locations 218 of the surviving candidates 217. The locations 218 can be, for example, any one or more of where the online dating candidate 216 lives, works, is currently located, or has indicated as a preference for a dating venue. If, as an example, a displayed count of the number of surviving candidates 217 is too large, the user 1002 could be prompted for further information by which to filter the population of surviving candidates 217. Or, alternatively, further user selection 208 of an affected zip code region 210 can enable, user gesture by user gesture, paging through the surviving candidates 217.

The facial image 212 can be, as in the instant embodiment, a profile photo 124 or other real-life likeness of the candidate 216. Advantageously, despite the possibility that the user 1002 might visually recognize the surviving candidate 217, location identifying information ("Richmond District" or "23134" for example) in the vicinity of the surviving candidate 217 may be removed from display. Not supplying the information or removing it from display increases the burden on a user 1002 of trying to look up online a surviving candidate 217, perhaps one he/she facial recognizes or for which he/she knows a first and/or last name, to discover his/her home address 128b, for example. If, on the other hand, the user 1002 selects the surviving candidate 217 by touching onscreen, or by clicking on, the facial image 212 of the surviving candidate 217, subsequent interactions may lead to the user 1002 obtaining the information the surviving candidate 217 has chosen to make available, as from the candidate's user profile 122. For instance, if a date is arranged, the online dating program 108 may make the home address 128b of the surviving candidate 217 available to the user 1002. A problem online dating sites have been facing is that it can take a long time, even a month, before a date can be fully arranged. Providing real-life likenesses of candidates 216 can streamline the process and, in accordance with aspects of the present invention, do so while addressing safety and privacy concerns.

The program 108 may communicate to the user 1002 that the facial image 212 of the user 1002 can be a real-life likeness.

Alternatively, the communication may be that it must be a real-life likeness. More specifically, the program 108 can be configured for mentioning to users 1002 a requirement of the program 108 that the user's facial image 212 be a real-life likeness of the user 1002. Accordingly, the facial image 212 of a surviving candidate 217 would ordinarily be a real-life likeness.

The user selection 208 or deselection of a zip code region 302, user choice of a facial image 212, and all other user interactions such as panning and zooming, i.e., the various kinds of interactive user gestures 220, are conveyable by various means. Among those means are a touchpad 222 or the touchscreen 102 of a laptop 226, phone 228, or personal computer; a mouse 230; and its left-click button 232. On a holographic display, an element (such as a zip code region 302) can be selected and highlighted 213 by manually touching the hologram as with the tip of a finger. The non-contact touching is another example of an interactive user gesture 220.

A zip code outline 206 may be displayed from the screen 102 just prior to the user selection 208, as seen in the geographical layout 202 on the left in FIG. 3. As in FIG. 2, the user selection 208 depicted in FIG. 3 highlights 213 the selected zip code region 310. Facial images 212, here two, then appear, representative of the surviving candidates 217 of the filtering 214 at their respective locations 218.

With reference to FIG. 4, user selection 208 can be made of an additional zip code region 402. As demonstrated in FIG. 4, the user 1002 can build a candidate search area 404 zip code by zip code via user selection 208 that highlights 213 display from the screen of selected ones of the zip code regions 410 and via user deselection 411 (represented by the mouse cursor 413) that removes 406, from display from the screen 102, highlighting 213 for deselected ones of the zip code regions 410.

The candidate search area 404 can be built up to encompass any number of zip code regions 410.

Filtering 214 can then be applied by actuating a soft button such as "FILTER."

At that point, facial images 212 of surviving candidates 217 can appear spontaneously.

Alternatively, if filtering 214 occurs responsive to user selection 208 of a zip code region, the facial images 212 are still visible, concurrently, for all zip code regions 410 currently in the candidate search area 404.

Figure 5:
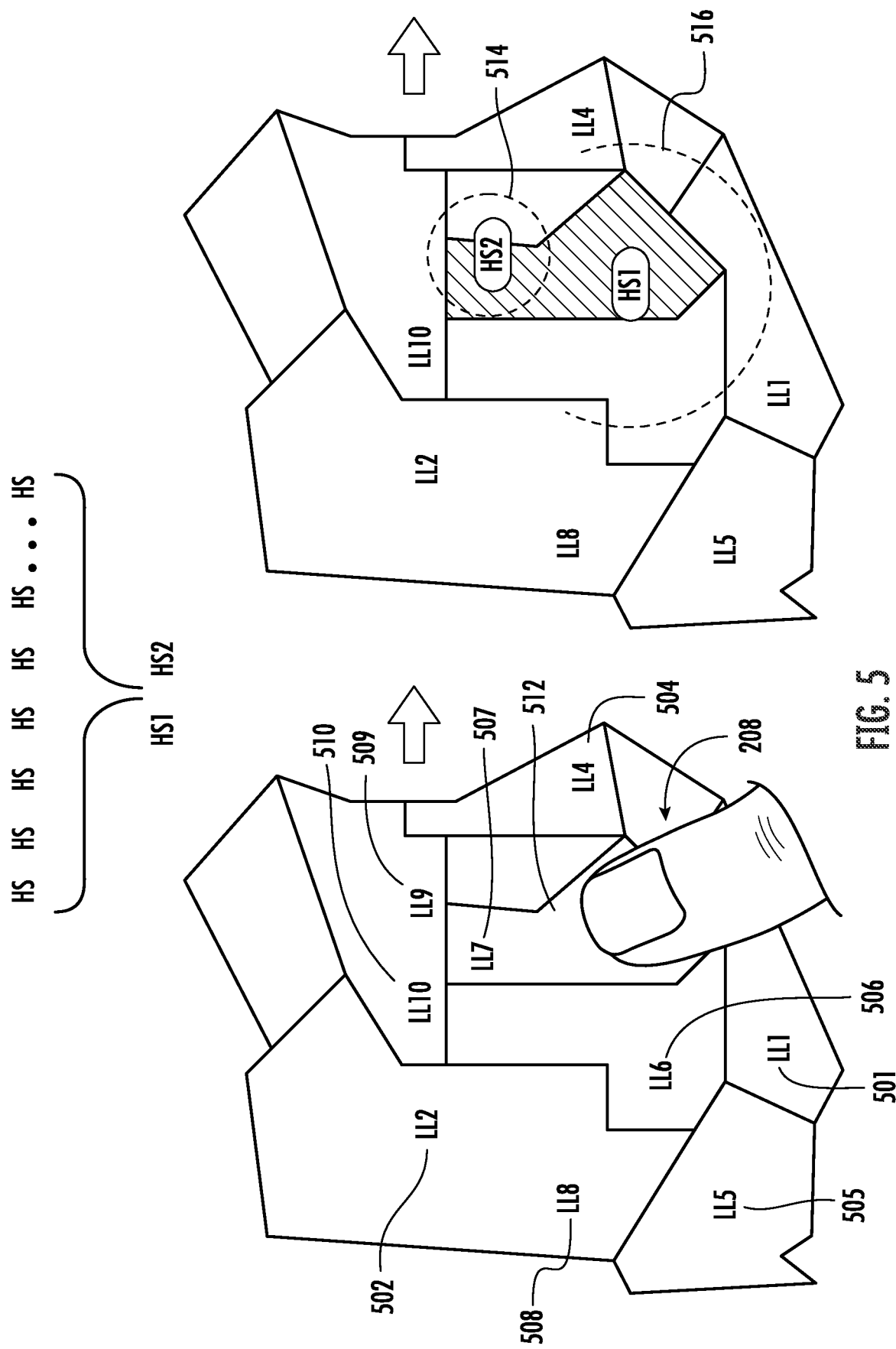
FIG. 5 is a schematic diagram exemplary of a user selection on an interactive electronic map of a zip code region, with its outline displayed beforehand, by which to filter online dating candidates, the schematic diagram also indicating that, further responsive to the user selection, location identifying labels within threshold distances of associated candidate locations shown on the map as respective facial images are removed from display in accordance with an aspect of the invention.

As seen in FIG. 5, location identifying labels 501, 502, 504, 505, 506, 507, 508, 509, 510 (such as "Union Square Park") other than zip codes 702, optionally together with zip codes 702, may just prior to a user selection 208 be present in the display from a screen 102 of a geographical layout 202. Upon the user selection 208 of a zip code region 512, location identifying labels 507, 509 (which includes any zip codes 702) are removed 406 from display, due to the location identifying labels 507, 509 being within a threshold distance 514 of the surviving candidate's location 218. The decision to remove is, in the illustrated embodiment, based on the threshold distance 514. It is not based on a facial image 212, at the location 218 of the surviving candidate 217, blocking, in whole or in part, visibility of the location identifying label 507, 509. This is seen in FIG. 5, because the location identifying label 509, for example, is removed but its visibility would otherwise not be blocked by a facial image 212, i.e., "HS2."

Likewise, upon the user selection 208 just made, a location identifying label 506 is removed 406 from display, because the location identifying label 506 is within a threshold distance 516 of another surviving candidate's location 218. In FIG. 5, the two threshold distances 514, 516 differ from each other. The threshold distance could, depending on the implementation, be the same for all candidates 216, or each candidate 216 may have the option of specifying their particular threshold distance 514, 516. In the latter case, the threshold distance 514 may be a field in the user profile 122.

In FIG. 6, the user 1002, in building a candidate search area 404, has made a user selection 208 of a second zip code region 610 without having deselected 411 a first zip code region 612. As a result of the user selection 208 of the second zip code region 610, local identifying labels 501, 505, 508 are, due to their proximity within respective threshold distances to the surviving candidates 613, 614, 615, removed 406 from display. Subsequent deselection 411 of the first zip code region 612 removes 406 from display, in the first zip code region 612, the facial images 212 and concomitantly restores the previously removed location identifying labels 507, 509. In an alternative version, the concomitant restoration is, in the interest of privacy and security, not implemented.

Zip codes 702 are initially displayed in the geographical layout 202 in FIG. 7.

User selection 208 of a zip code region 302 removes 406 from display the zip code 702 for that zip code region 302, as discussed further herein above. This happens regardless of whether a facial image 212 appears onscreen. Although, in some embodiments, it happens only if both a candidate 216 from among the filtered online dating candidates survives the filtering 214 and a facial image 212 of a surviving candidate 217 is displayed in the selected zip code region 310. Whether the facial image 212 would, at the location 218 of the surviving candidate 217, block visibility of the zip code 702 may be irrelevant. As mentioned, the zip code 702 removed 406 is not displayed or otherwise automatically revealed to the user 1002. In an alternative design, user selection 208 of a zip code region 302 removes 406 from display more zip codes 702, such as all zip codes 702 in the geographical layout 202.

FIG. 8 shows that an outline, at the outset, of a zip code region 802 can be a thickened outline 806. Here, too, is an example of highlighting 213 operating on the outline 806, but not fill 807, of the selected zip code region 808.

FIG. 9 is similar to FIG. 8, except that the highlighting 213 operates on fill 907, but not the outline 906. It is also possible for the highlighting 213 to operate both on fill 907 and the outline 906.

Figure 10:
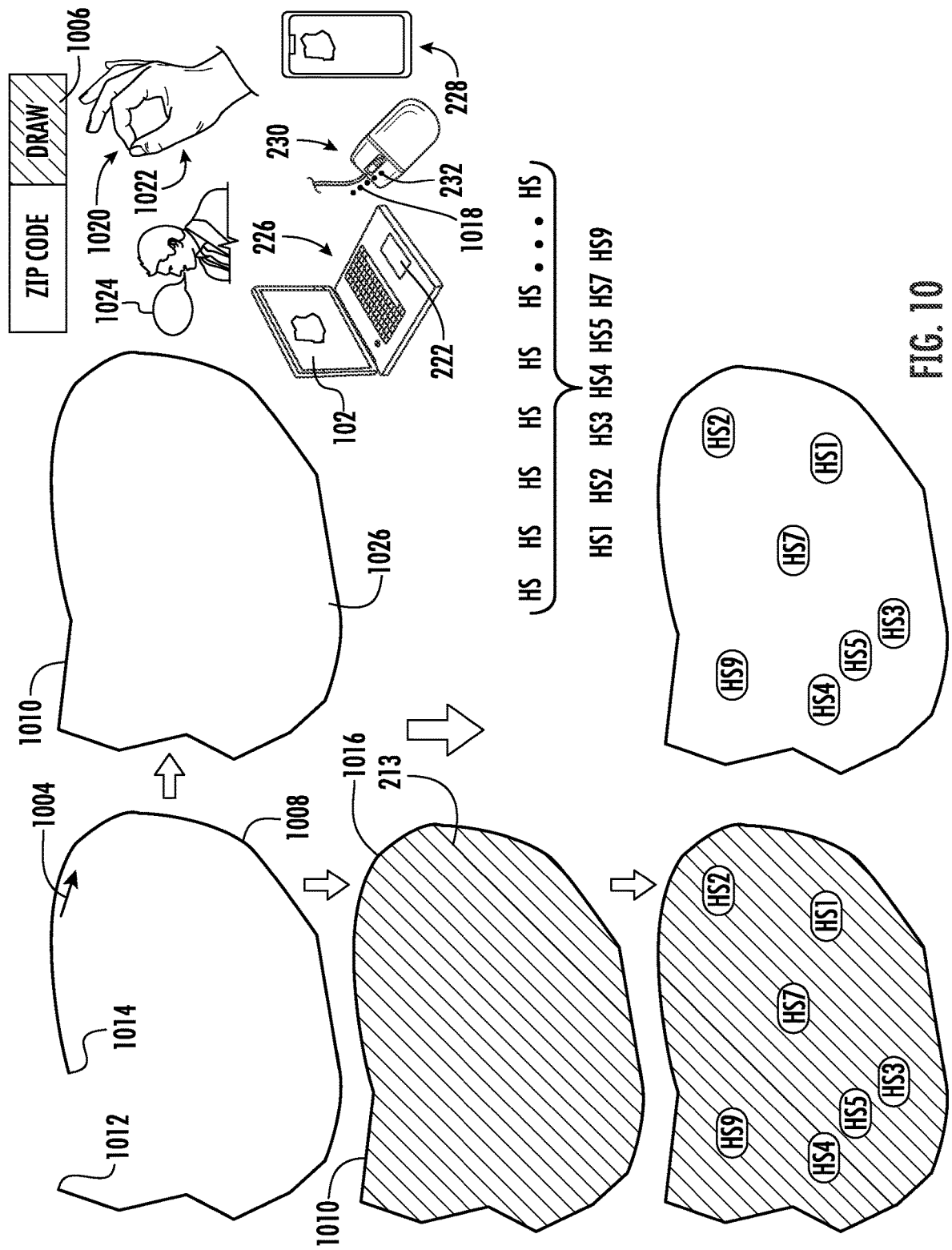
FIG. 10 is a schematic diagram exemplary of, on an interactive electronic map, interactive drawing that creates, for filtering online dating candidates, an enclosed area with or without highlighting in accordance with an aspect of the invention.

FIG. 10 depicts a user 1002 interactively, in drawing mode 1006 of operation, drawing, within the geographical layout 202 (best seen in FIG. 2), a continuous line 1008 serving as a boundary within which the user 1002 can search for candidates 216. In drawing the continuous line 1008, the user 1002 need not complete a closed figure. That is, if the user disengages from interactively drawing 1004, a line such as a straight line 1010 to complete the boundary will automatically be drawn from the current ending point 1012 to the starting point 1014. This will create at least one enclosed area 1016, all of which become highlighted 213. Instead of a straight line 1010, the line generated could be a smooth fitting for joining the non-connected ends of the continuous line 1008. The boundary of the at least one enclosed area 1016 would therefore include the smooth fitting. The highlighting 213 and the filtering 214 would accordingly be applied to the resulting at least one enclosed area 1016.

In particular, the online dating program 108 performs the following, via the interactive electronic map module 110: a) interactively with the user 1002, by user gesture 220 (which is discussed above in connection with FIG. 2), drawing 1004 for display from the screen 102 a continuous line 1008 by, starting from a starting point 1014, advancing to a current ending point 1012; b) in real time, detecting, from user gesture 220 (such as lifting one's finger from the touchscreen 102), disengagement 1018 from the drawing 1004 (with reference numeral 1018 being directed to a dotted line which represents user disengagement 1018); and c) responsive to the detecting of the disengagement, highlighting 213 display from the screen 102 of the at least one enclosed area 1016 that was formed (and still exists) if the starting and current ending points 1014, 1012 are already connected or, if the starting and current ending points 1014, 1012 are not already connected, that would be formed by connecting the starting and current ending points 1014, 1012 with the straight line 1010.

It is also possible, if the starting and current ending points 1014, 1012 coincide, to, regardless of whether the user 1002 has disengaged 1018, highlight 213 in real time the at least one enclosed area 1016 formed. In particular, it is also possible to monitor for coincidence of the starting and current ending points 1014, 1012 without monitoring for user disengagement 1018.

However, the user 1002 may never actually connect the starting and ending points 1014, 1012. If the connection is made but the user 1002 overshoot it, it is not clear whether the user is intending to extend a boundary, as in forming a figure-8 or another configuration of multiple closed planar figures. Screen feedback reflecting, in response to user disengagement 1018, automatic connection in real time of the starting and current ending points 1014, 1012, shows the user 1002 how the user gesture 220 (hand movement for instance) is being interpreted. A soft button or other means can be included for allowing the user 1002 to redo the drawing 1004 if, for example, what is shown onscreen is unintended. Accordingly, automatic, real-time connection, responsive to user disengagement 1018 from the drawing 1004 is a feature the user 1002 is likely to find helpful.

In the instant patent application, "real time" is defined as executing without intentional delay, given the processing limitations of the system and the time required to accurately carry out the function based on the data input.

In FIG. 10, reference numeral 1018 is illustratively associated with a dotted line which represents user disengagement 1018 from the drawing 1004, e.g., removal of the user's finger from the left-click button 232 of the mouse 230. User disengagement 1018 can also occur by removal of a user's finger from the touchpad 222 or the touchscreen 102 of a laptop 226, phone 228, or personal computer. A user gesture 1020 formed, for example, by touching the tip of the thumb to the tip of the index finger of one hand may be visually recognized by a display system, without any contact with a screen, as indicating 1022 user disengagement 1018. Such a system is described in U.S. Pat. No. 8,555,207 to Hildreth, et al. Thus, the user 1002 could draw 1004, in the air, with one hand and signal user disengagement 1018 with the other hand. As an alternative, a voice command 1024 may signal user disengagement. The detecting of user disengagement 1018 may detect a user disengagement event that is a member of the group consisting of: breaking manual contact with a touchscreen 102 or touchpad 222; manually releasing a control of a mouse 230; uttering a voice command 1024 such as "CONNECT"; or making a user gesture 1020 that is contactless (with the computing device 101 executing the program 108) just prior to, at the time of, and just after the user gesture 1020. In the latter case, the program 108 is configured for recognizing the particular contactless user gesture 1020 made as indicative 1022 of a user disengagement event.

In an alternative implementation having at least one enclosed area 1026, the at least one enclosed area 1026 is not highlighted 213.

The program 108 further performs the step of filtering 214 online dating candidates 216 based on location 218 within an enclosed area 1016 from among the at least one enclosed area. In the alternative implementation which does not highlight 213 enclosed area(s), the program 108 further performs the step of filtering 214 online dating candidates 216 based on location 218 within a (non-highlighted) enclosed area 1026 from among the at least one enclosed area.

In either implementation, i.e., with or without highlighting 213, facial images 212 of surviving candidates 217 are displayed from the screen 102.

Figure 11:
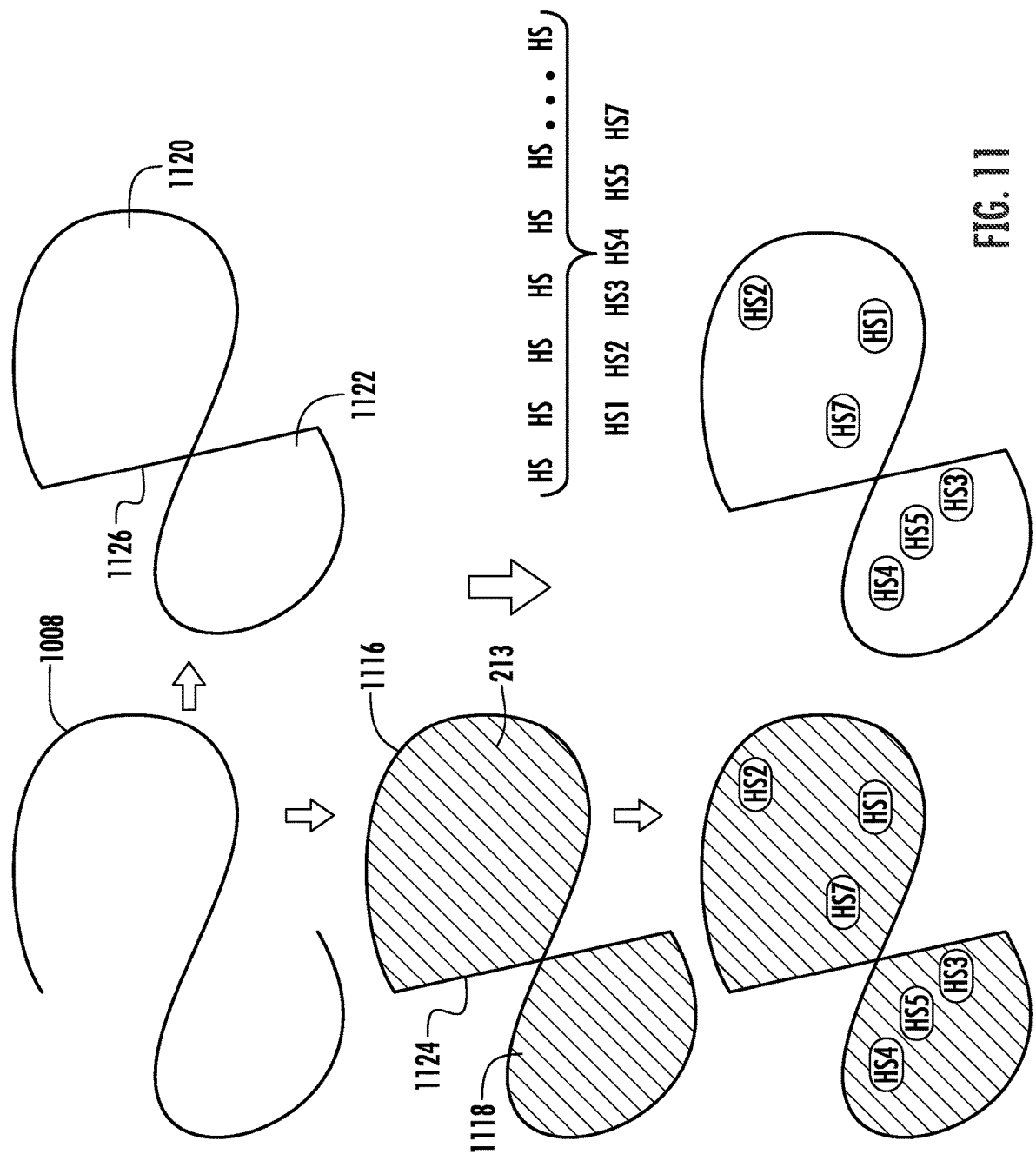
FIG. 11 is a schematic diagram exemplary of, on an interactive electronic map, interactive drawing that creates, for filtering online dating candidates, two enclosed areas with or without highlighting in accordance with an aspect of the invention.

A case in which more than one enclosed area 1116, 1118, 1120, 1122 is formed by a straight line 1124, 1126 is seen, by example, in FIG. 11. The enclosed areas 1116, 1118, 1120, 1122 may be highlighted 213 as shown for the enclosed areas 1116, 1118 on the left, or not highlighted 213 as shown for the enclosed areas 1120, 1122 on the right.

In either implementation, i.e., with or without highlighting 213, facial images 212 of surviving candidates 217 are displayed from the screen 102.

Figure 12:
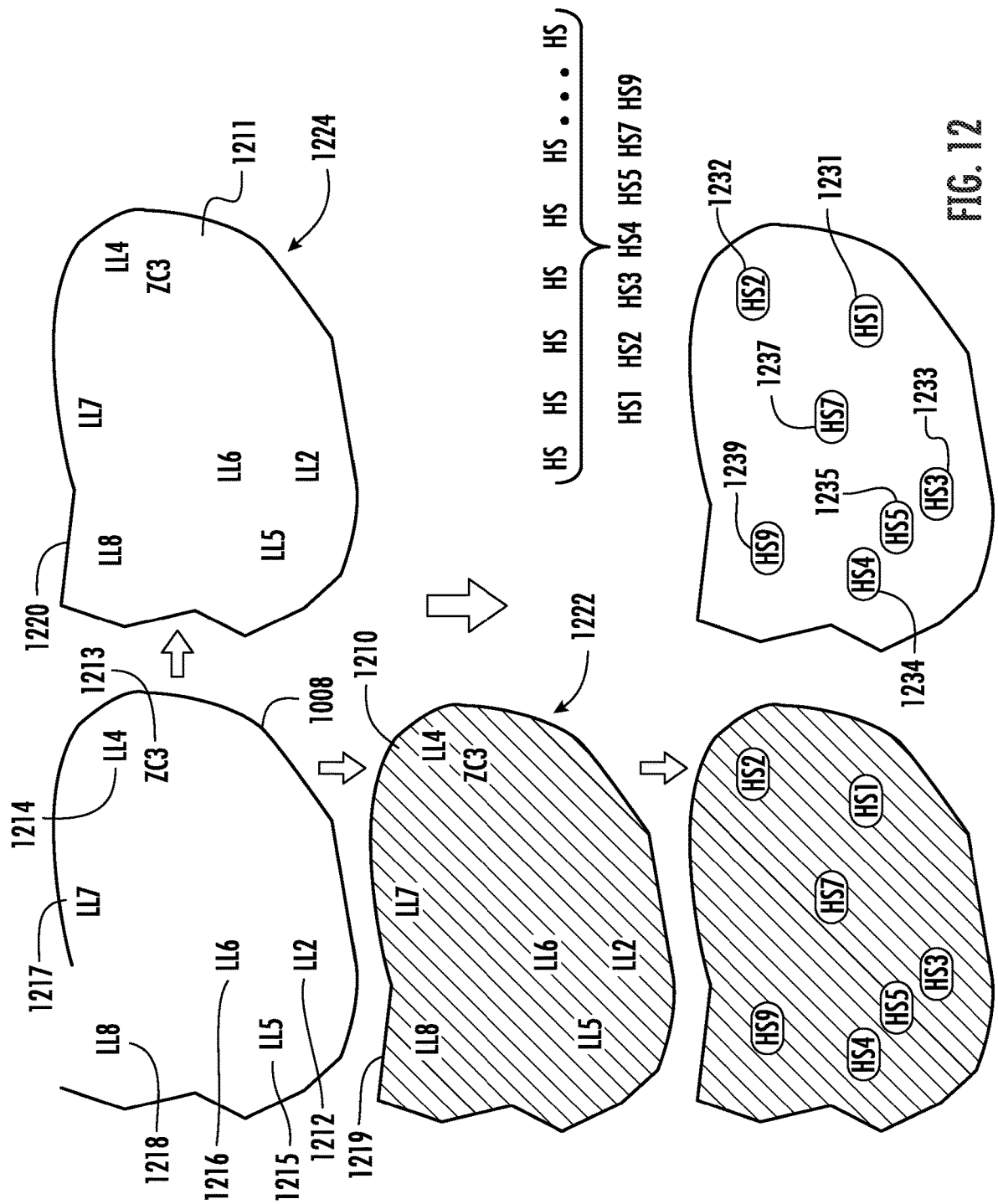
FIG. 12 is, similar to FIG. 10, a schematic diagram exemplary of, on an interactive electronic map, interactive drawing that creates, for filtering online dating candidates, an enclosed area with or without highlighting, and of, further responsive to the user selection, removal of location identifying labels that are within any enclosed area in which a candidate survived the filtering, in accordance with an aspect of the invention.

The geographical layout 202 for FIG. 12, and particularly the enclosed area 1210, 1211 within the geographical layout 202, contain location identifying labels 1212, 1213, 1214, 1215, 1216, 1217, 1218. A particular location identifying label 1213 is indicated in FIG. 12 as "ZC3" which is a zip code 702.

User disengagement 1018 from drawing 1004 causes the interactive electronic map module 110 to generate, and display from the screen 102, the straight lines 1219, 1220 in respective highlighted 213 and non-highlighted embodiments 1222, 1224.

In both embodiments 1222, 1224, facial images 212 are displayed, from the screen 102, for surviving candidates 217. The location identifying labels 1212, 1213, 1214, 1215, 1216, 1217, 1218 are removed 406 from display for each of the at least one enclosed area having a surviving candidate 1231, 1232, 1233, 1234, 1235, 1237, 1239. This holds for each of the two embodiments 1222, 1224. In the instant example, the at least one enclosed area is, in fact, a single enclosed area—there is a single enclosed area for each of the two embodiments 1222, 1224. For each of the two embodiments 1222, 1224, there is a surviving candidate. Thus, all of the location identifying labels 1212, 1213, 1214, 1215, 1216, 1217, 1218 are removed 406 from display.

In an alternative version, removal 406 of the location identifying labels 1212, 1213, 1214, 1215, 1216, 1217, 1218 is selective by label, based on whether the label resides within a threshold distance 514 of the location 218 of a respective surviving candidate 1231, 1232, 1233, 1234, 1235, 1237, 1239.

Similar to the case of zip codes 702, in an alternative design removal 406 of location identifying labels 506 may extend beyond the enclosed area 1210, 1211 to include, for example, all the location identifying labels 506 in the geographical layout 202.

Figure 13:
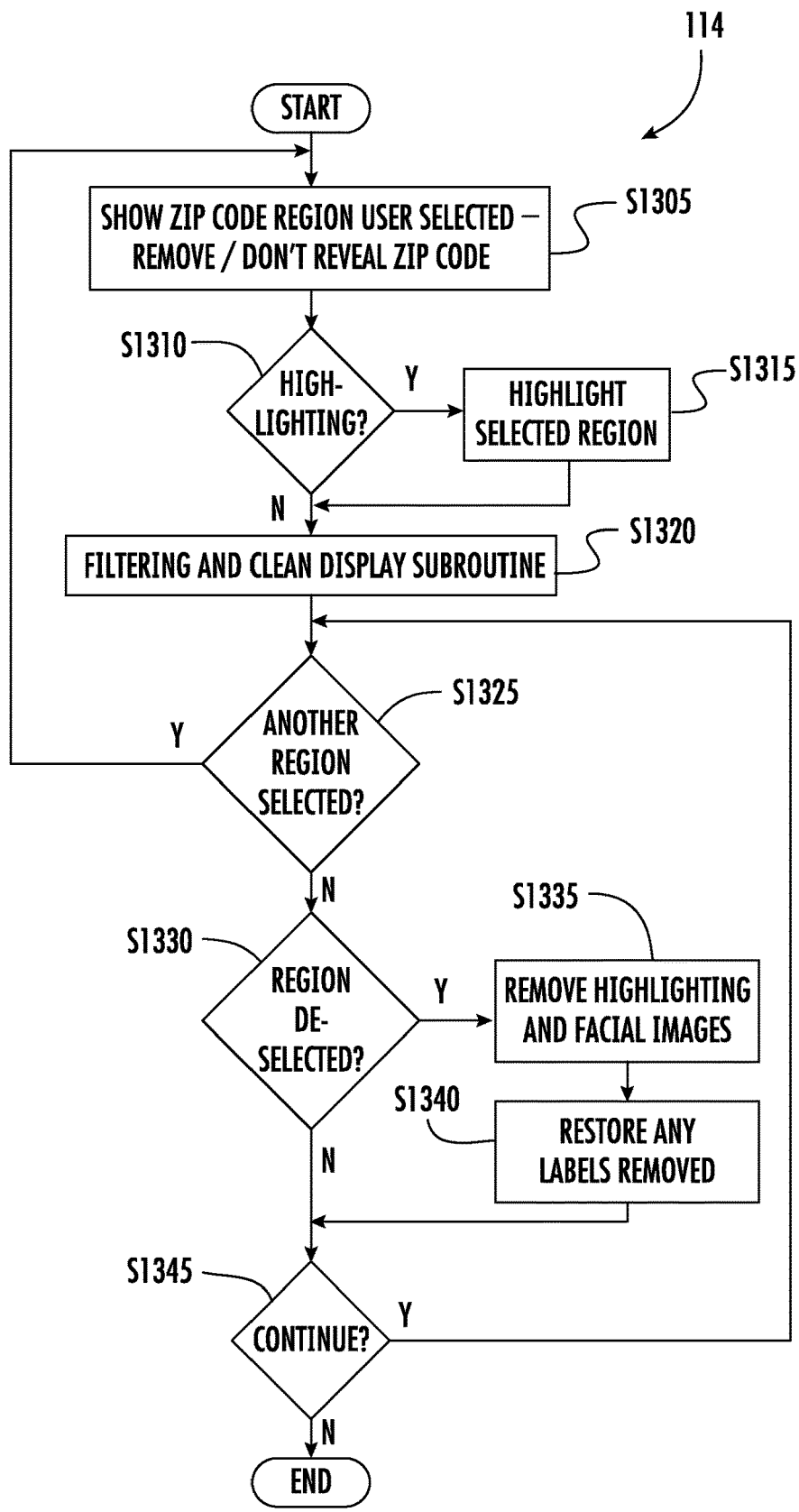
FIG. 13 is a flow chart providing an example of zip code mode in accordance with an aspect of the invention.

FIG. 13 provides an example of the zip code mode module 114 operating in the zip code mode 130 of operation. Either the user 1002 chooses zip code mode 130 or zip code mode 130 is presently operative by default.

User selection 208 of a zip code region 302 either removes 406 an already-displayed zip code 702 from display from the screen 102 or, if no zip code 702 was being displayed just prior to the user selection 208, does not cause 704, by itself, displaying, or otherwise revealing to the user, the zip code 702 (step S1305). If highlighting 213 of the selected zip code region 210 is enabled (step S1310), user selection 208 of the zip code region 302 highlights 213 the zip code region 302 (step S1315). In either case, the filtering and clean display subroutine 118 is invoked, and the selected zip code region 210 is specified for the subroutine call (step S1320). If, after return from the subroutine, another zip code region 302 is selected (step S1325), processing branches back to step S1305. If, on the other hand, after return from the subroutine, an already-selected zip code region 210 is deselected 411 (step S1330), any highlighting 213, and any facial images 212 of surviving candidates 217, being displayed in the zip code region 210 are removed 406 from display from the screen 102 (step S1335). In addition, optionally, all location identifying labels 506 (zip codes 702 being one type of such) previously removed 406 from display from the screen 102 are restored for display from the screen 102 (step S1340). If zip code mode 130 is to continue (step S1345), processing branches back to step S1325.

Figure 14:
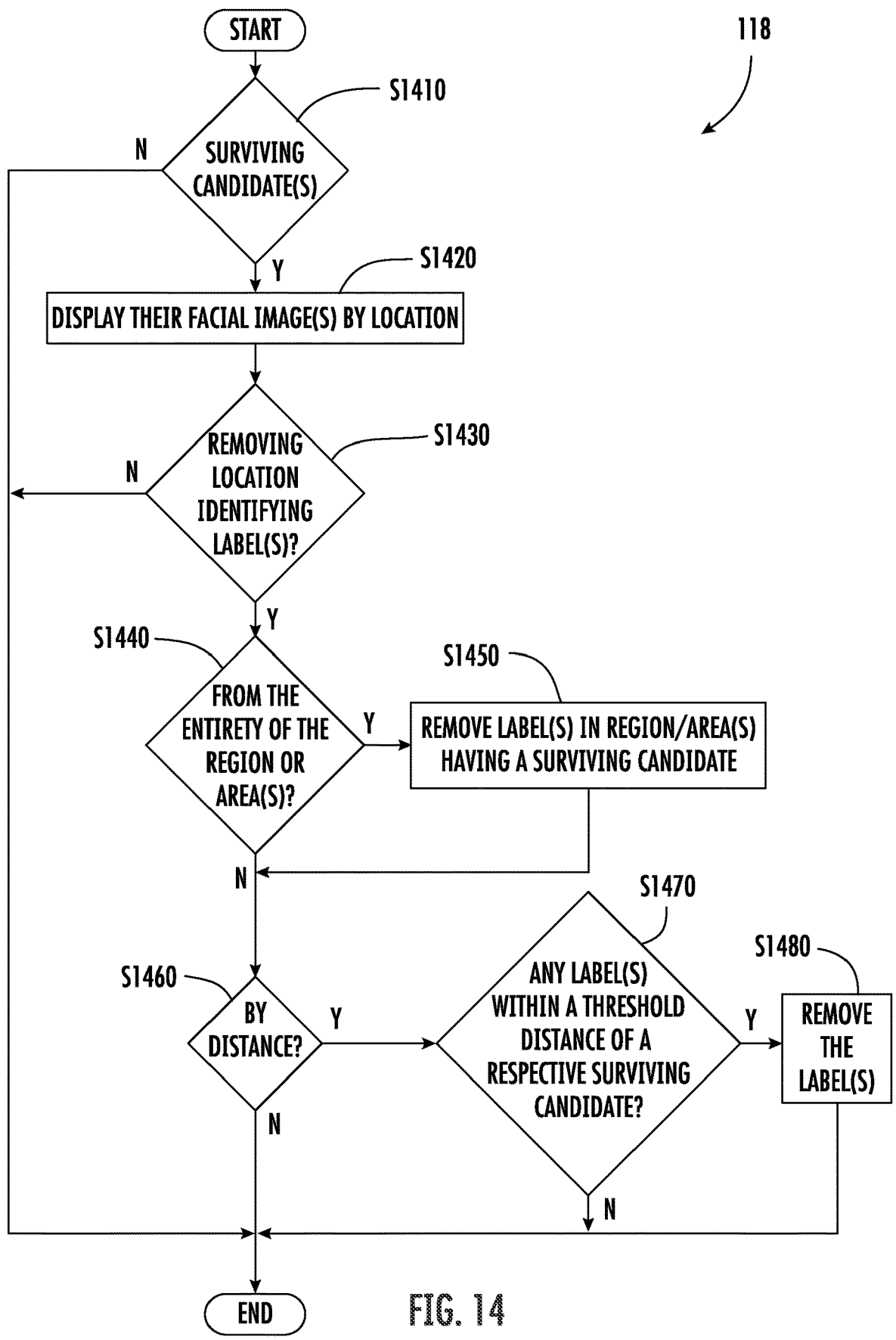
FIG. 14 is a flow chart providing an example of a "filtering and clean display" subroutine in accordance with an aspect of the invention.

FIG. 14, illustrates by example, the filtering and clean display subroutine 118.

Query is made as to whether, in the specified at least one enclosed area 1016 or specified zip code region 302, there exists a surviving candidate 217 (step 1410). If so, the facial image 212 of each surviving candidate 217 is displayed at the respective location 218 (step S1420). If location identifying labels 506 are to be removed 406 (step S1430), query is made as to whether removal 406 is from the entirety of the specified territory, i.e., the entirety of the at least one enclosed area 1016 or specified zip code region 302 (step S1440). If removal 406 of location identifying labels 506 is being made from the entirety of the specified at least one enclosed area 1016 or specified zip code region 302 (step S1440), the removal 406 proceeds if the area(s) 1016 or region 302 have a surviving candidate 217 (step S1450). Query is then made as to whether removal 406 of location identifying labels 506 is to be made based on a threshold distance 514 (step S1460). If removal 406 of location identifying labels 506 is to be made based on a threshold distance 514 (step S1460), query is made as to whether any location identifying labels 506 are within a threshold distance 514 of a respective surviving candidate location 218 (step S1470). If any location identifying labels 506 are within a threshold distance 514 of a respective surviving candidate location 218, those labels 506 are removed 406 (step S1480).

Figure 15:
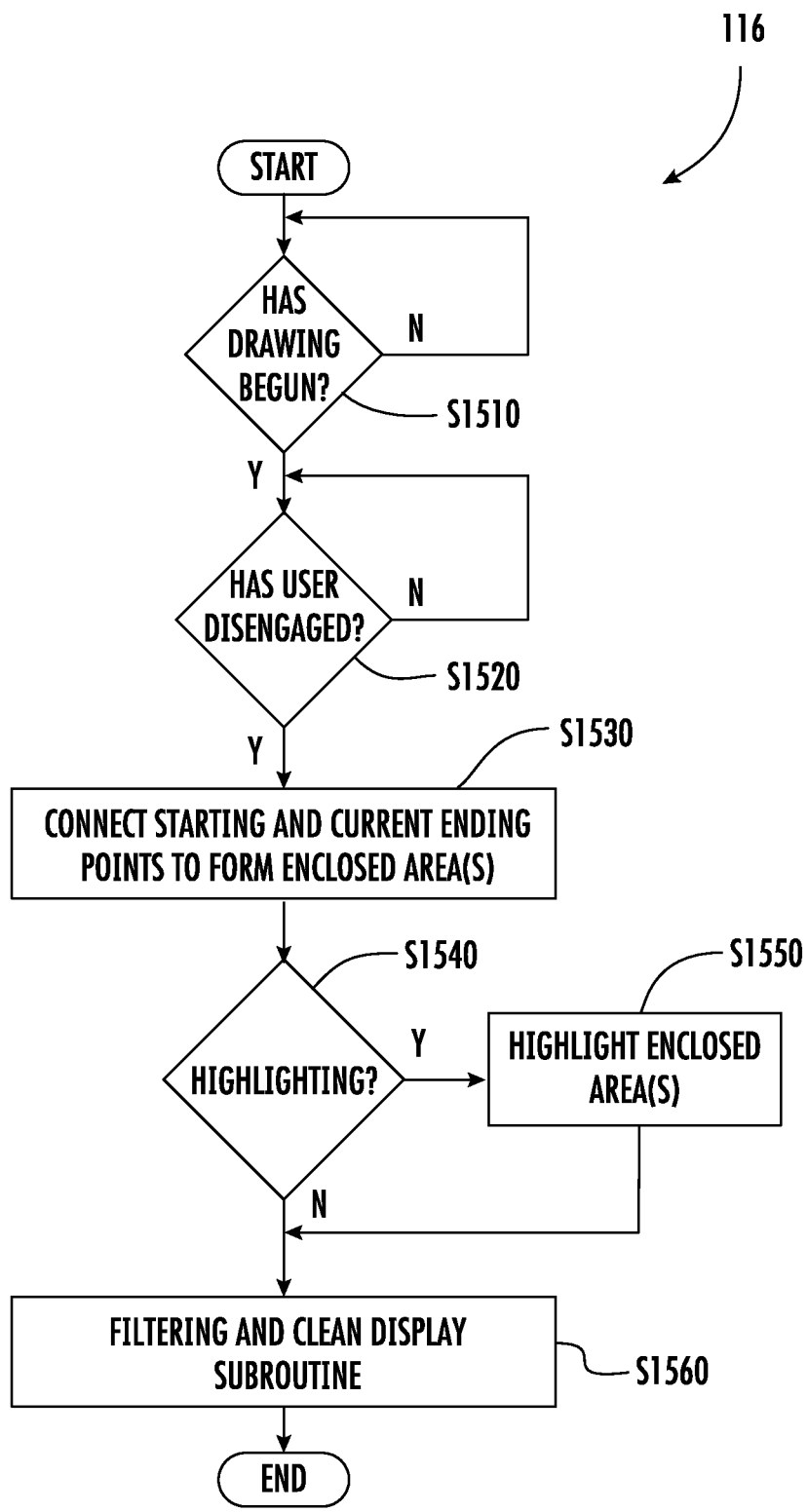
FIG. 15 is a flow chart providing an example of drawing mode in accordance with an aspect of the invention.

FIG. 15, illustrates by example, the drawing mode module 116 operating in the drawing mode 1006 of operation. Either the user 1002 chooses drawing mode 1006 or drawing mode 1006 is presently operative by default.

The interactive electronic map module 110 determines in the drawing mode 1006 when interactive drawing 1004 has begun (step S1510). This is detectable by means of the touchscreen 102, by the user 1002 making contact within the geographical layout 202 such that the contact is detected. Making contact with a pencil's eraser, for example, will not be detected by a capacitive type of touchscreen, the type used by most higher-end smartphones. Provided detectable contact is made, the interactive electronic map module 110 records the starting point 1014. The starting point 1014 may have a thickness more than a pixel wide and may consist of more than one pixel, i.e., a group of pixels. The same holds for all points in the path of the drawing 1004. The path of the drawing 1004 is recorded, coordinate by coordinate, and is echoed onscreen. In particular, each next pixel, or pixel group, in the path is displayed interactively in real time and persists onscreen. Subsequently, when it is detected that the user has disengaged 1018 from the drawing 1004 (step S1520), the interactive electronic map module 110, having recorded the current ending point 1012, automatically and in real time connects the current ending point 1012 to the starting point 1014 with a straight line 1010 if the starting and ending points 1014, 1012 are not already connected. The straight line 1010 may have a thickness more than a pixel wide. The starting and ending points 1014, 1012 can be deemed already connected if they share at least one pixel. If at least one pixel is shared, the interactive electronic map module 110 may, if warranted, perform the additional step of smoothing the boundary at the connection by providing filling pixels or removing excess pixels. The filling pixels, for example, may be those on or close to straight lines between pixels of the starting point 1014 and pixels of the ending point 1012. If the starting and ending points 1014, 1012 are not already connected upon user disengagement 1018 (step S1520), the straight line 1010 automatically drawn at that time is automatically and in real time displayed from the screen 102 (step S1530). The straight line 1010 completes the path drawn 1004 onscreen to form at least one enclosed area 1016. If highlighting 213 is enabled (step S1540), the at least one enclosed area 1016 is highlighted 213 for display from the screen 102 (step S1550). In either case, the interactive electronic map module 110 calls the filtering and clean display subroutine 118 with the at least one enclosed area 1016 as a parameter (step S1560).

In an aspect, an interactive electronic map module 110 displays, from a screen 102, a geographical layout 202 that includes land area 204 divided into zip code regions 302 defined by respective zip codes 702. Responsive to user selection 208 in the land area 204, the interactive electronic map module 110 highlights 213 the selected zip code region 210. Online dating candidates 216 are filtered 214 based on location 218 within the selected zip code region 210. In another aspect, an interactive electronic map module 110 is configured for: a) interactively with the user 1002, drawing 1004 for display a continuous line 1008 by, starting from a starting point 1014, advancing to a current ending point 1012; b) in real time, detecting user disengagement 1018 from the drawing 1004; and c) responsive to detecting disengagement 1018, highlighting 213 display of the at least one enclosed area 1016 that was formed if the starting and current ending points 1014, 1012 are already connected or, if the starting and current ending points 1014, 1012 are not already connected, that would be formed by connecting the starting and current ending points 1014, 1012 with a straight line 1010. The program 108 is further configured for filtering 214 online dating candidates 216 based on location 218 within an enclosed area 1016. A real-life likeness of each surviving candidate 217 is displayed at their map location 218. Location identifying labels 506 are removed 406 or withheld from display by area/region 1016, 302 or based on proximity to a surviving candidate 217.

What is proposed is a user-friendly graphical user interface (GUI) for quickly finding and assessing online dating candidates while respecting privacy and safety concerns.

While the invention has been illustrated and described in detail in the drawings and foregoing description, such illustration and description are to be considered illustrative or exemplary and not restrictive; the invention is not limited to the disclosed embodiments.

For example, user disengagement 1018 from the drawing 1014 may be signaled to a display system with a camera by presenting forward the palm of a hand with outstretched fingers and then closing the fingers.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

A computer program can be stored momentarily, temporarily or for a longer period of time on a suitable computer-readable medium, such as an optical storage medium or a solid-state medium. Such a medium is non-transitory only in the sense of not being a transitory, propagating signal, but includes other forms of computer-readable media such as register memory, processor cache and RAM.

A single processor or other unit may fulfill the functions of several items recited in the claims. The mere fact that certain measures are recited in mutually different dependent claims does not indicate that a combination of these measured cannot be used to advantage.

What is claimed is:

1. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
   responsive to user selection in the land area, highlighting, by the interactive electronic map module in its display from the screen, a zip code region from among said zip code regions that was selected by virtue of said user selection; and
   filtering online dating candidates based on location within the selected zip code region, wherein if the selected zip code was being displayed from the screen just prior to the user selection, the user selection removes the selected zip code from being displayed from the screen.

2. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
   responsive to user selection in the land area, highlighting, by the interactive electronic map module in its display from the screen, a zip code region from among said zip code regions that was selected by virtue of said user selection; and
   filtering online dating candidates based on location within the selected zip code region, wherein if the selected zip code was being displayed from the screen just prior to the user selection, the user selection removes the selected zip code from being displayed from the screen if both a candidate from among the filtered online dating candidates for the selected zip code survives the filtering and a facial image of a surviving candidate is displayed in the selected zip code region.

3. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
- responsive to user selection in the land area, highlighting, by the interactive electronic map module in its display from the screen, a zip code region from among said zip code regions that was selected by virtue of said user selection; and
- filtering online dating candidates based on location within the selected zip code region, wherein if the selected zip code is not being displayed from the screen just prior to the user selection, the user selection does not, by itself, cause the program to display the selected zip code from the screen.

4. The non-transitory computer readable medium of claim 3, wherein:
- the selected zip code was, just prior to the user selection, not being displayed from the screen but, just prior to the user selection, an outline of what was to subsequently become the selected zip code region was being displayed, without fill, from the screen; and,
- responsive to said user selection, fill of the selected zip code region is displayed from the screen.

5. The non-transitory computer readable medium of claim 3, wherein if the selected zip code is not being displayed from the screen just prior to the user selection, the user selection does not, by itself, cause the program to reveal the selected zip code to the user.

6. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
- responsive to user selection in the land area, highlighting, by the interactive electronic map module in its display from the screen, a zip code region from among said zip code regions that was selected by virtue of said user selection; and
- filtering online dating candidates based on location within the selected zip code region, wherein if the selected zip code is not being displayed from the screen just prior to the user selection, a candidate from among the filtered online dating candidates for the selected zip code survives the filtering and a facial image of a surviving candidate is displayed in the selected zip code region, the user selection does not, by itself, cause the program to display the selected zip code from the screen and does not, by itself, cause the program to otherwise reveal the selected zip code to the user.

7. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
- responsive to user selection in the land area, highlighting, by the interactive electronic map module in its display from the screen, a zip code region from among said zip code regions that was selected by virtue of said user selection; and
- filtering online dating candidates based on location within the selected zip code region, wherein from among said plurality of acts there is the further act of, responsive to the filtering, removing, from display from the screen, location identifying labels within respective threshold distances of locations in the selected zip code region of said online dating candidates who, by virtue of said location within the selected zip code region, have survived the filtering, if any of said online dating candidates has, by virtue of said location within the selected zip code region, survived the filtering.

8. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
- responsive to user selection in the land area, highlighting, by the interactive electronic map module in its display from the screen, a zip code region from among said zip code regions that was selected by virtue of said user selection; and
- filtering online dating candidates based on location within the selected zip code region, wherein from among said plurality of acts there is the further act of, responsive to the filtering yielding at least one, from among said online dating candidates, who has survived the filtering by virtue of said location within the selected zip code region, removing from display from the screen all, if any, location identifying labels within the selected zip code region.

9. A non-transitory computer readable medium embodying an online dating program, wherein the program comprises an interactive electronic map module for displaying, from a screen, a geographical layout that includes land area, wherein the land area is divided into zip code regions defined by respective zip codes, said program having instructions executable by a processor for performing a plurality of acts, wherein from among said plurality of acts there are the acts of:
- responsive to user selection in the land area, highlighting, by the interactive electronic map module in its display from the screen, a zip code region from among said zip code regions that was selected by virtue of said user selection; and
- filtering online dating candidates based on location within the selected zip code region, wherein from among said plurality of acts there is the further act of:
- building a candidate search area zip code by zip code via user selection that highlights display from the screen of selected ones of the zip code regions and via user deselection that removes, from display from the screen, highlighting for deselected ones of the zip code regions;
- wherein facial images of the online dating candidates who, based on location within respective ones of the currently highlighted zip code regions, survive filtering triggered by user actuation for the candidate search area are, in response to the triggered candidate-search-area filtering, concurrently displayed from the screen if there are any such surviving candidates.

* * * * *